United States Patent [19]

DiPippo et al.

[11] Patent Number: 5,243,531
[45] Date of Patent: Sep. 7, 1993

[54] METHOD FOR ROUTING AND SCHEDULING OPERATIONS ON ELEMENTS OF A WORK PRODUCT IN A PRODUCTION SYSTEM

[75] Inventors: Gerard L. DiPippo, New Hope; Scott P. Bialor, Langhorne; David R. Sternman, Alkins Park; Thomas J. O'Neill, Spring Mount, all of Pa.

[73] Assignee: Volt Information Sciences, Inc., New York, N.Y.

[21] Appl. No.: 589,807

[22] Filed: Sep. 28, 1990

[51] Int. Cl.$^5$ .............................................. G06F 15/46
[52] U.S. Cl. .............................. 364/468; 364/474.11; 364/188; 364/478; 364/474.24; 364/474.22
[58] Field of Search ........... 364/468, 474.11, 188–192, 364/474.22, 474.24, 478, 470

[56] References Cited

U.S. PATENT DOCUMENTS

| | | | |
|---|---|---|---|
| 4,796,194 | 1/1989 | Atherton | 364/468 |
| 4,845,634 | 7/1989 | Vitek et al. | 364/468 |
| 4,956,784 | 9/1990 | Hadavi et al. | 364/468 |
| 4,961,148 | 10/1990 | Holda et al. | 364/468 |
| 5,016,183 | 5/1991 | Shyong | 364/470 |
| 5,111,408 | 5/1992 | Amjadi | 364/474.24 |

Primary Examiner—Jerry Smith
Assistant Examiner—Jim Trammell
Attorney, Agent, or Firm—Kenyon & Kenyon

[57] ABSTRACT

A method for controlling work on a job in a system for producing a plurality of jobs, each of which includes at least one piece of work, each piece of work requiring at least one operation to be performed, the system having several types of stations at which the operations are performed has the following steps. It first accepts into the system a set of job requirements for a job, the set of job requirements including requirements for each of the constituent pieces of work of the job. The method then creates an electronic image of the requirements for each piece of work, the image having a unique image identifier. Next, a set of control information for each piece of work is maintained that includes the unique image identifier and a unique identifier for the pieces of work. Each of the pieces of work are moved among the types of stations at which work on the piece must be performed, and the image of the requirements for one of the pieces of work is presented to the station to which the piece of work with which the image is associated is presented when the piece of work reaches the station.

11 Claims, 31 Drawing Sheets

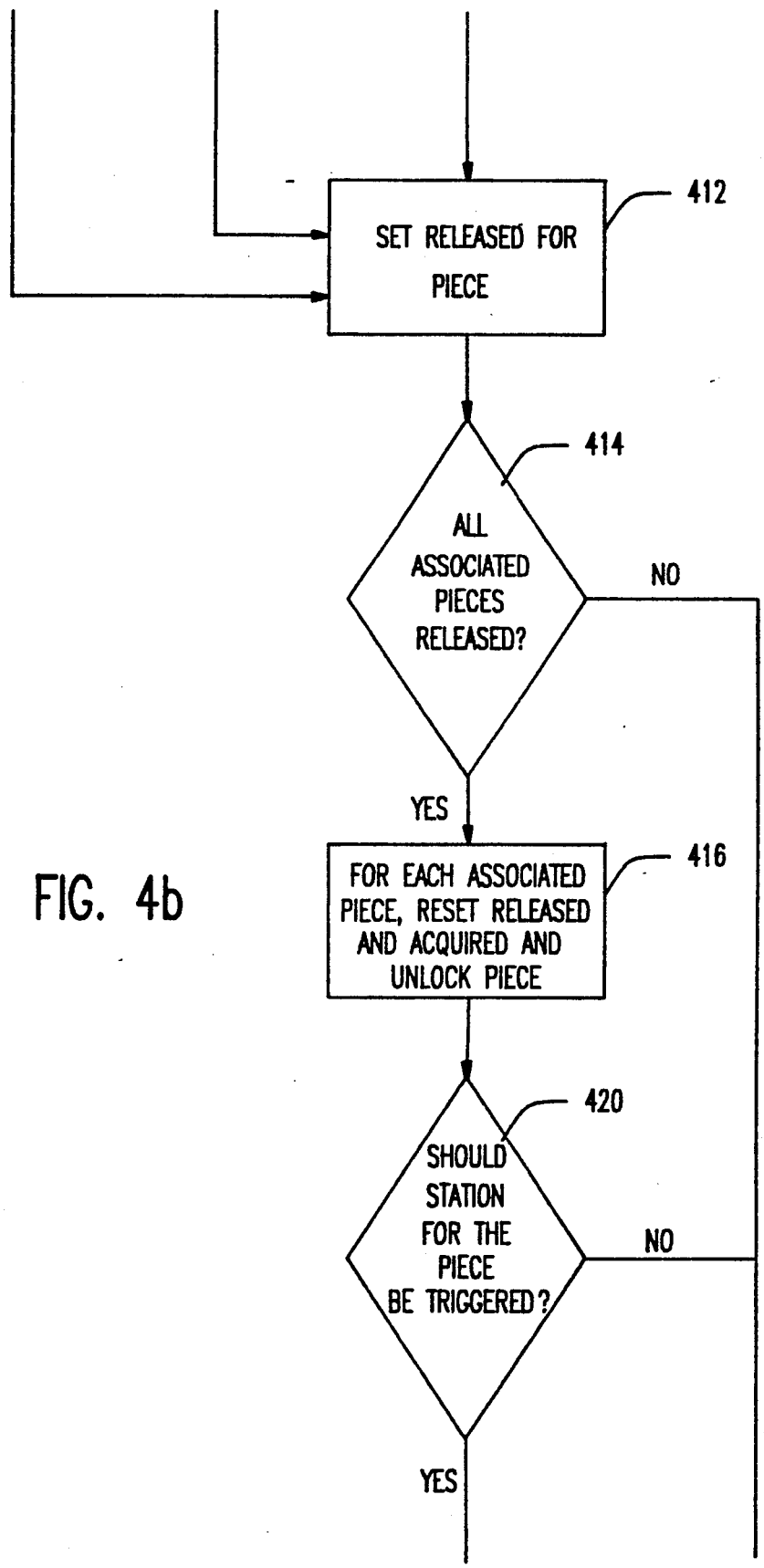

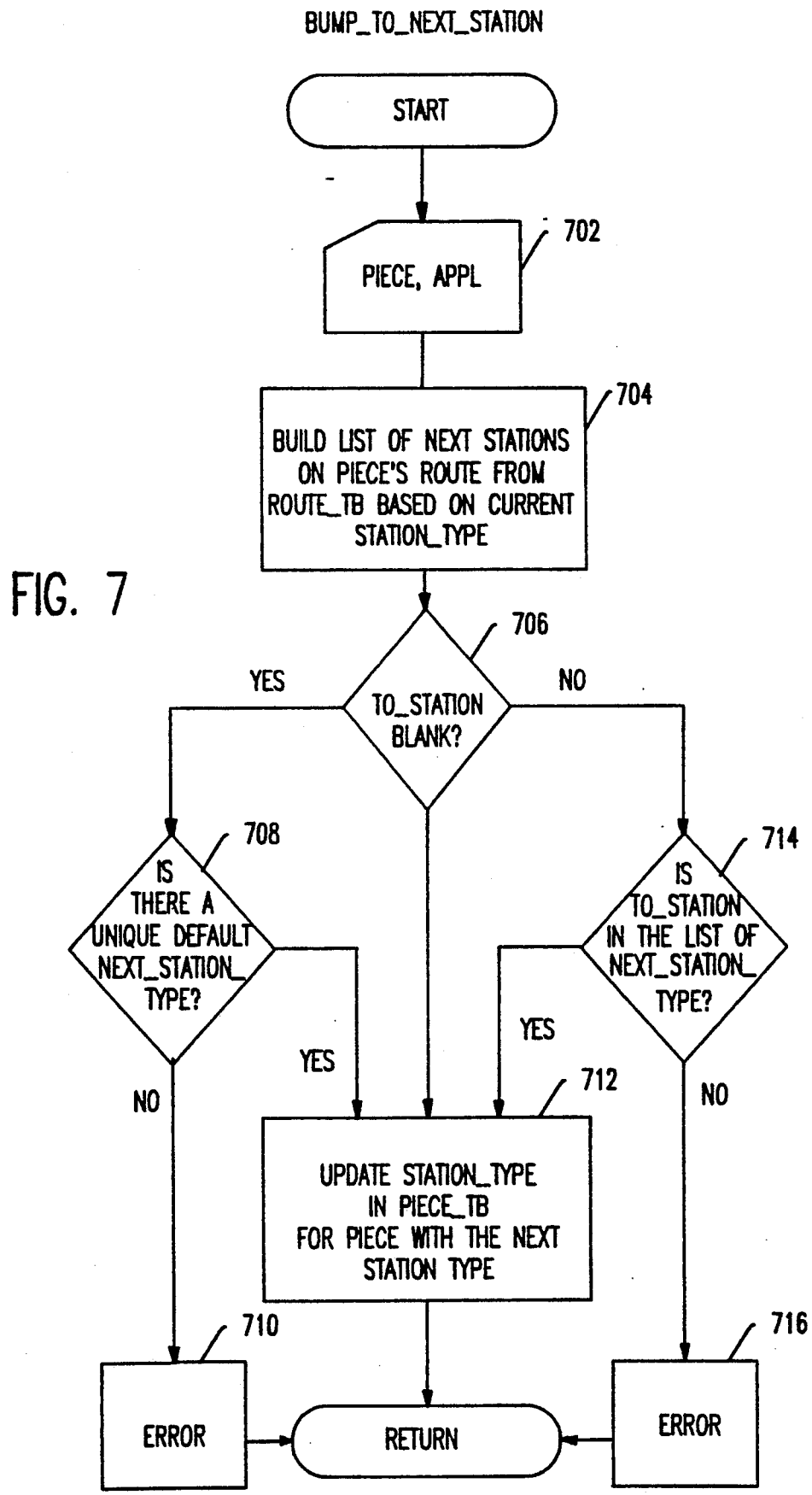

METHOD FOR ROUTING AND SCHEDULING OPERATIONS ON ELEMENTS OF A WORK PRODUCT IN A PRODUCTION SYSTEM

BACKGROUND OF THE INVENTION

The invention relates to production system control methods, and specifically to a method for efficiently routing and scheduling operations in a production system on elements of a work product.

An Appendix is attached hereto and is a part of the disclosure hereof.

In general, production systems create a variety of work products in response to external orders or demands by allocating and applying multiple resources to perform work on components, or "pieces," of the work products, assembling the pieces, and discharging the completed products from the system. Each resource is typically a single worker performing a single task on one or more pieces at a time. The task and the worker/task combination is referred to herein as a "station." A job is produced by passing its constituent pieces through a sequence of stations. The sequence of stations through which each piece passes is referred to as the "route" for the piece.

As a piece is presented to a station for the task to be performed on it, the station's operator must generally consult a control document, containing information from the job order such as a drawing or set of instructions, to ensure that the operator performs the appropriate task on the piece. At a station, a piece may be created, merged with other pieces into a smaller number of pieces, or eliminated.

A particular work product to be made in response to a particular work order, referred to herein as a "job," will typically have an associated deadline specified in the work order. Each of the constituent pieces of the job have a "priority" for handling by the system that is determined by the deadline or by other criteria. Such a system usually has many jobs in progress at once, so that several pieces may concurrently require operation by the same resource. The order in which a resource operates on a piece is determined by the priority of the piece or the job with which it is associated.

The most efficient use of a production system occurs when work products are discharged from the system in such a way as to maximize the number of work orders that are satisfied with products of adequate quality within the deadline specified for each order with the minimum expenditure of resources. Conventional control methods for such systems do not yield the most efficient use of the system. Conventional systems involve significant manual effort in determining how to route pieces through the system and how to prioritize work done on the pieces by each station and in presenting the appropriate control document to the station as the corresponding piece reaches the station for operation. The systems are relatively inflexible in that it is difficult to change the routes that pieces take through the system without disrupting the system's operation.

SUMMARY OF THE INVENTION

These drawbacks are overcome with the method of the invention, referred to as the Router-Imager-Scheduler (RIS) process. The RIS process controls the production of jobs having varying completion requirements by one or more production systems. Given a specified set of pieces for a job and a specified route for each piece through a production system, the Router portion of the RIS process controls the processing to ensure that each piece follows the appropriate route. The routes are not fixed while the pieces are in the system; they ca be readily modified during processing to allow dynamic control of the process without disrupting production. An electronic image of each job order, drawing, or other document that contains information concerning performance of a function or operation at a station is stored and the image for a piece is presented by the Imager portion of the RIS process to the operator of each station in accordance with the sequence identified by the Router as the corresponding piece reaches the station. The Scheduler portion of the RIS process maintains queues of pieces making conflicting, simultaneous demands on a station for presentation to the station in accordance with established priorities.

BRIEF DESCRIPTION OF THE DRAWINGS

FIGS. 4a to 4c are a schematic representation of a routine employed in the operation of the invention in which a piece is released to a subsequent station.

FIG. 7 is a schematic representation of a routine employed in the operation of the invention in which a piece is moved to the next station on its route.

DETAILED DESCRIPTION

Figure 1A:
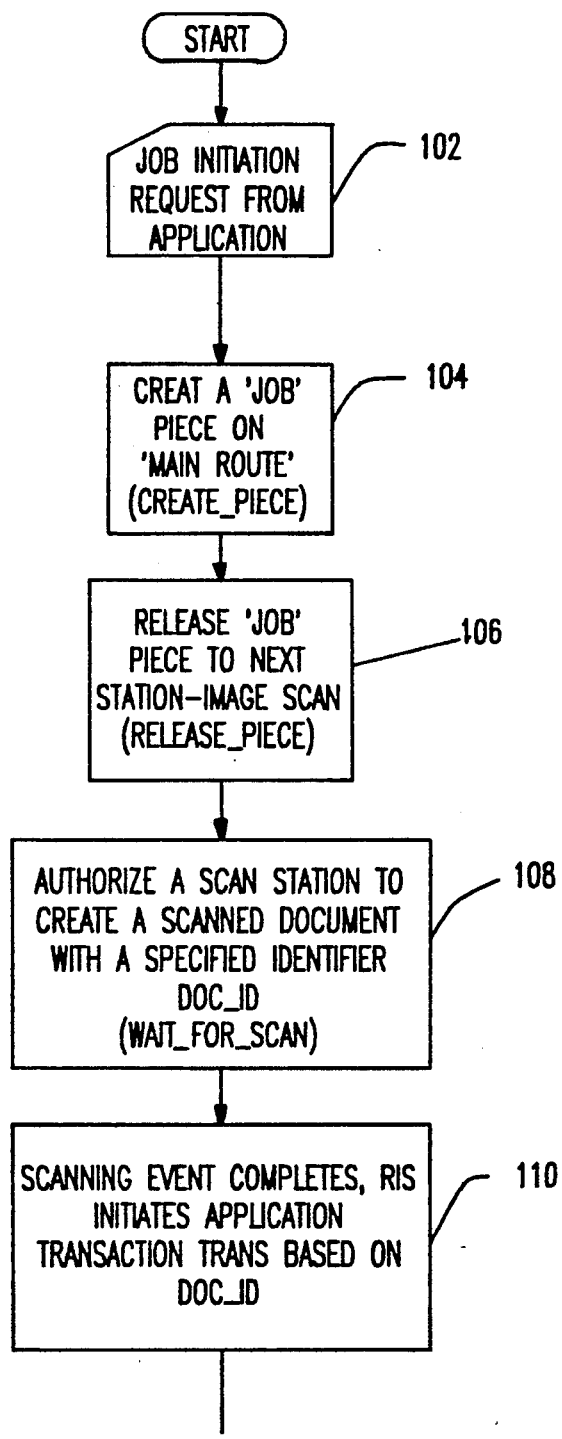
FIGS 1a to 1d are a schematic representation of the operation of the invention.
Figure 1B:
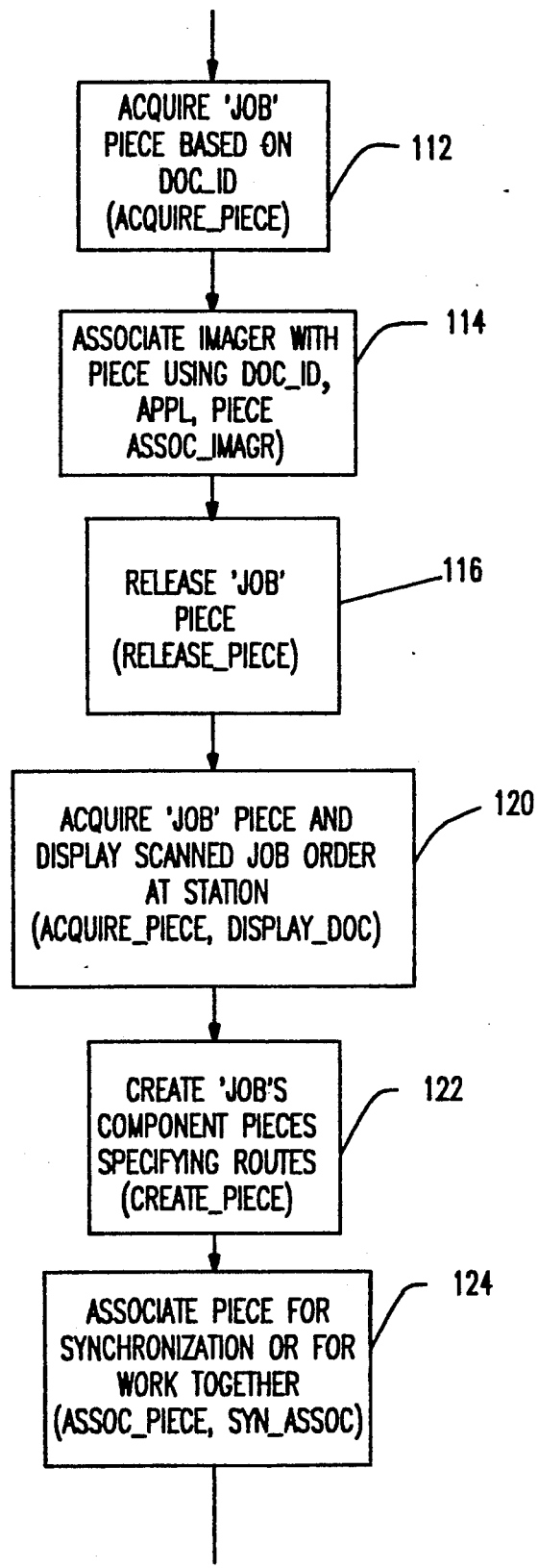
Figure 1C:
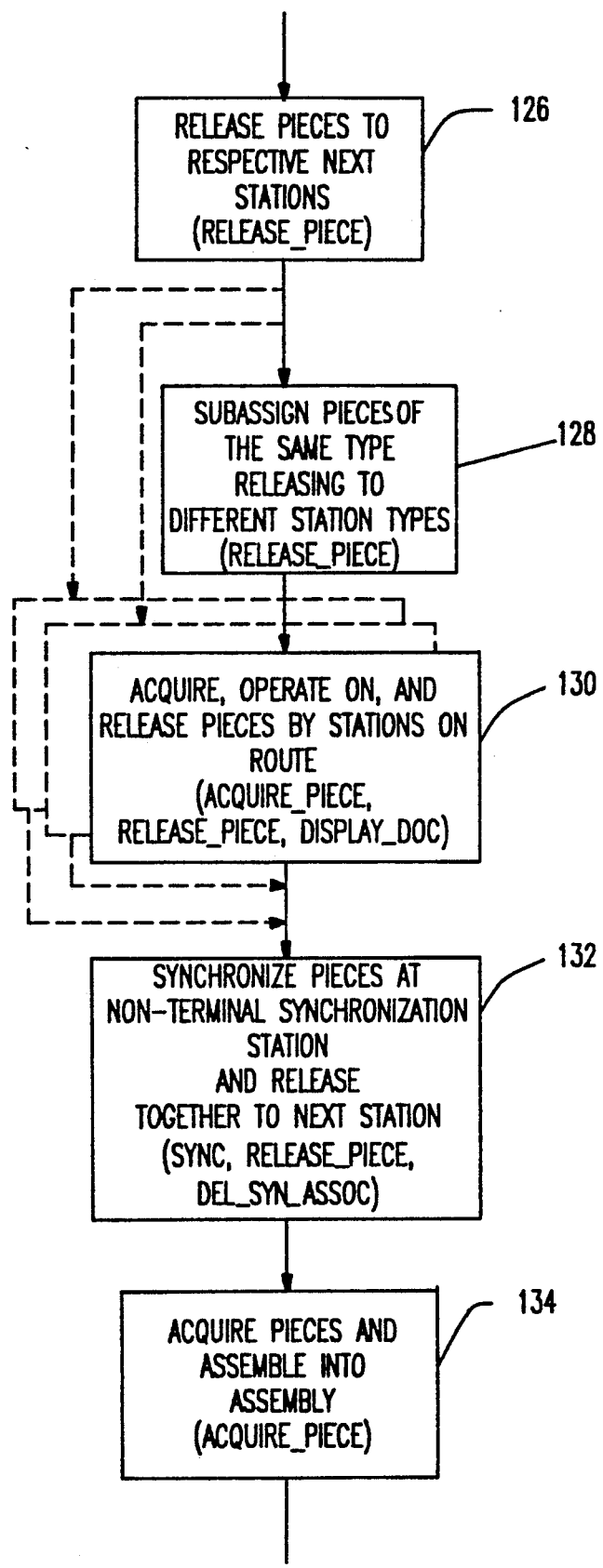
Figure 1D:
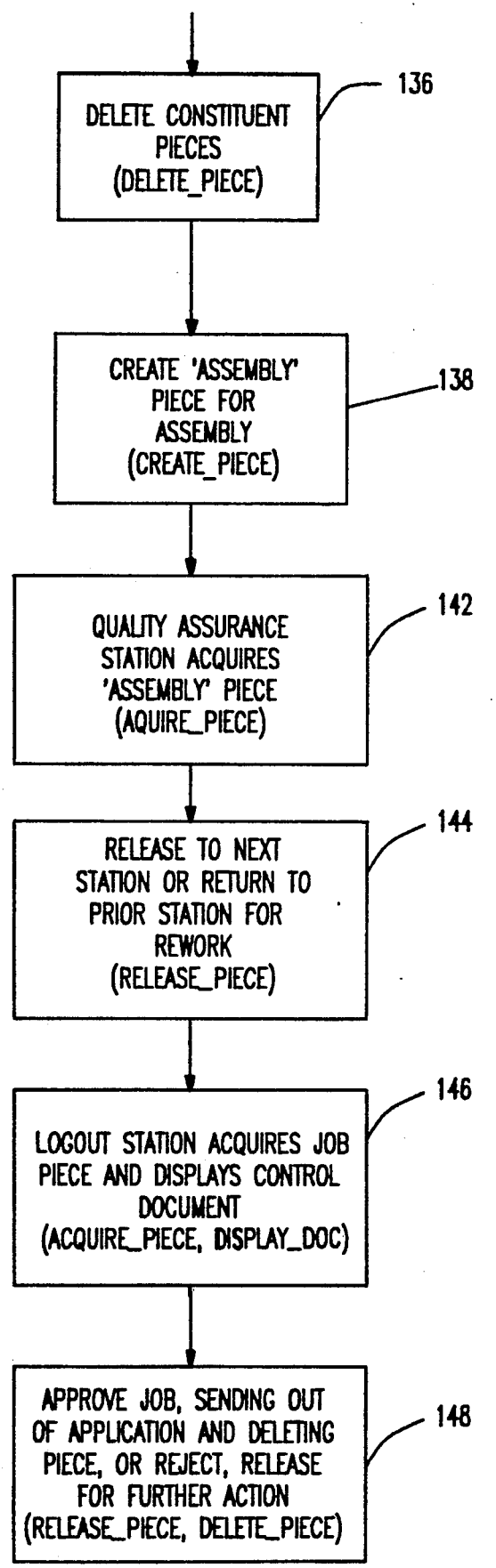

The method of the invention, the RIS process, is illustrated in FIGS. 1a to 1d. In broadest terms, the method involves the following steps: a) accepting a job order and assigning unique identifiers to it and its component pieces; b) associating with each piece a specified route through which the piece should pass among the production system's stations; c) presenting an image of a control document to each station that operates on a piece of the job as the piece reaches the station; d) scheduling the flow of pieces for multiple jobs through the system in accordance with priorities established for each job's pieces; e) collecting related pieces at particular points in the process as required by the specific manufacturing application; and f) discharging the product from the system.

The RIS process can implement these steps for each of several production systems, or "applications," simultaneously. In the illustrated embodiment, the RIS process is implemented as software operating on a host computer on which several application software systems are also operating. The RIS process software is "called" by each of the applications at any of a number of points in the application's production process. The RIS process tracks the identity of the application for which it performs each desired step or operation.

In the illustrated embodiment, RIS is implemented in the PL1 programming language and is compiled with the PL1 Optimizing Compiler 5.1. It employs the DB2 version 2.1 database manager. RIS (and the applications) operate on an IBM 3090 Model 150S using the MVS ESA version 3.2 operating system. Images are managed with IBM ImagePlus release 1.1. Each of the application stations are IBM PSII Model 70 microcomputers using the IBM DOS version 3.0 operating system. Scanning stations use Bell & Howell Scanner Model #2115.

The Router, Imager, and Scheduler components of the RIS method each perform several functions and are embodied in various routines or operations. The Router portion of the RIS process coordinates the flow of pieces through each of the applications' production systems, tracking the location and availability of each piece on its designated route through the production system. The Imager portion of the RIS process manipulates and tracks images of control documents through image tables, described below. The Scheduler manages queues of pieces based on piece priorities assigned by the application when the piece is created and provides mechanisms for altering the priority of individual pieces and for reprioritizing all pieces, or selected subsets of pieces, at once.

RIS requires as input from the application a set of data for each job and piece; based on this data it constructs and maintains other tables of control data that it uses to manage the work flow. The functions and routines use and manipulate the values of the control data in the various tables.

FIGS. 1a to 1d show how a job flows through one sample application with the application making calls to the various components of RIS to have it manage the flow. It identifies in each step the RIS routine that performs the operation requested by the application. The identified routines are described in more detail below. The various steps shown in FIGS. 1a to 1d are not performed in one uninterrupted sequence by RIS. Rather, RIS performs the operation requested by the application in one or more steps, then returns control to the application and awaits further instructions or requests. These returns are not shown.

The first sequence of steps utilize RIS to enter a new job order into the application for production. The application requests RIS to initiate the job, by routing a RIS piece, providing information to RIS including a unique identifier for the job. RIS first creates at step 104 a 'job' piece in the system with which the scanned job order will be associated, using the CREATE_PIECE routine. It then releases the newly created 'job' piece to the next station in the system, using the routine RELEASE_PIECE at step 106. This next station is not a physical station with an operator; it is an asynchronous, non-terminal station at which the 'job' piece is held until the scanned job order is available.

The second sequence of steps relate to the acquisition of the scanned images for the job order processing. An application initiates this by calling the WAIT_FOR_SCAN routine at step 108, creating an authorization for a scan station in the production system to scan in the physical job order documents. A parameter TRANS is passed to that routine that identifies a transaction to initiate once document scanning is complete at a scanning station. Once the scan has been created at step 110 by the scanning station, RIS initiates the application transaction for the completed document, which in this example acquires at step 112 the 'job' piece, displays the document by calling DISPLAY_DOC, and releases at step 116 the 'job' piece, which is now associated with the scanned job order image by the unique identifier DOC_ID, to the next station. The relation of documents to pieces as supported by RIS is a many-to-many association; although this example shows a one-to-once case.

The next sequence of steps involves the creation of the pieces that are to be processed through the application's production system. The application will typically have a station at which a job order is received, the tasks required to respond to the job order are identified, and the tasks are assigned to stations or sequences of stations. This station is termed a "task assignment" station. In step 120 the 'job' piece is acquired by the task assignment station (by calling the RIS routine AC- QUIRE_PIECE) and the corresponding image of the job order is displayed (by calling the RIS routine DISPLAY_DOC. The operator of the task assignment station then issues in step 122 requests to RIS to create each of the job's constituent pieces. This is done by calling the CREATE_PIECE routine once for each piece. In each call, the application specifies the route that the piece is to take among the production system's stations and the piece's priority.

The application also specifies relationships among the created pieces that dictate how those pieces are handled by the production system relative to each other. For example, if several pieces are assembled into a subassembly of the final product at a particular type of station, those pieces are associated with each other for purposes of synchronizing their arrival at a station of that type. Given a group of associated pieces and the identity of the station type at which they are to be synchronized, RIS ensures that none of the pieces arrive at a station of that type unless all of the pieces have passed through preceding stations on their routes and are all available for processing at that station. A group of pieces may also be associated for purposes of having the same operator work on each of them, termed "work together" association. The application issues these synchronization or work together association instructions to RIS in step 124 by calling the routines ASSOC_PIECE (for work together association) and SYNC_ASSOC (for synchronization association).

After the pieces are created, they are released to their respective stations by calling the RIS routine RELEASE_PIECE for each piece in step 126, where they fan out to progress along their individual routes. Finally, the application instructs RIS to delete the 'job' piece, which was only needed as a vehicle for transporting the job information to the task assignment station before a document was available in scanned form. The piece is deleted by calling the RIS DELETE_PIECE routine.

The next sequence of steps relate to the processing of the job's constituent pieces on their respective routes among the stations of the application's production system. After a piece has been released from the task assignment station, it enters a "queue" for the next station type identified in its route. This queue represents the concept that pieces ready to be processed by stations of a given station type are acquired by such stations generally in order of the pieces' priorities.

For example, a production system may have three identical computer drawing stations and pieces from many jobs that require operation by a drawing station. As a drawing station operator finishes work on one piece and therefore becomes available to work on another piece, RIS typically has that operator's station acquire from among the pool of pieces awaiting drawing operations the piece with the highest priority. Each piece's priority is maintained in the piece table PIECE_TB.

Depending on the specific implementation of the database manager, it may maintain an index of pieces in priority order (in which case there is an actual queue) or it may respond to a request for the highest priority item by making a query of the piece table (in which case there is not actual queue).

As noted above, RIS can allocate pieces to stations on other than a strict priority basis. Pieces that are associated for synchronization are not handled by the synchronizing station until they are all available. Pieces that are work together associated are all handled consecutively by a single operator even if a piece in the group has a lower priority than a piece not in the group. The application can also specify that a particular piece be handled by a station next regardless of other priorities.

Another parameter that affects the selection of stations that can work on a piece is the operating company identifier OPCO, set for a piece when it is created. An operating company is an external source of job orders that can have unique requirements for processing of pieces for its jobs. One such requirement can be that only certain operations or station types can work on the company's pieces. This control is implemented in the ACQUIRE_PIECE routine, in which a station cannot acquire a piece if the station is not among those on a list passed to the routine.

As illustrated in step 128, a system may also have subassignment stations at which the processing of pieces of the same type can be differentiated. For example, if a job requires two pieces of art work, one of which had been made for another job and is therefore in inventory and one of which must be made for this job, the subassignment station can release the pieces to different stations. The piece that needs to be made would be released to the next station on its default path, where it is made, from which it might be released to a quality assurance station. In contrast, the piece that is in inventory can be released directly to a quality assurance station. This is implemented in the RIS RELEASE_PIECE routine, in which the next station can be specified or be left as the default next station on the route.

Step 130 represents much of the typical processing of job pieces through production system, in which successive stations of the station types specified in a piece's route acquire a piece and display the associated control document image to the station's operator, perform the required application operation, and release the piece to the next station, using the ACQUIRE_PIECE, DISPLAY_DOC, and RELEASE_PIECE routines.

Step 132 illustrates the synchronization of pieces that are to be combined to form a new piece. The synchronization takes place at a non-terminal, synchronization station and is implemented with the RIS SYNC routine. As each of the constituent pieces are released to the synchronization station, the SYNC routine is invoked to check the synchronization association table SYNC_ASSOC_TB to determine if all of the associated pieces have yet been released to that station. Once all of them are, the routine releases the pieces to the next station using the RELEASE_PIECE routine and eliminates the synchronization association data using the DEL_SYNC_ASSOC routine.

The following steps take place at the next application station. First, in step 134, the station acquires the pieces using the ACQUIRE_PIECE routine and assembles the pieces using the appropriate application function. Then, in step 136, the station deletes the constituent pieces using the DELETE_PIECE routine. The station then creates in step 138 an 'assembly' piece for the assembly using the CREATE_PIECE routine. Finally, in step 140, the station releases the assembly piece to the next station.

The assembly piece would typically be released to an application quality assurance station type at which it would be evaluated against the job order o other control document. In step 142, a quality assurance station acquires the assembly piece and displays the control document image. The operator of the quality assurance station either accepts the assembly piece, in which case it is released to the next station on its route, or rejects it, in which case it is released to a prior station for rework. This is implemented by the RELEASE_PIECE routine, either specifying a particular prior station or leaving the default next station.

Several assemblies can be combined in a single job, each assembly, and the combination of the assemblies, going through a process such as that described above. Finally, the job is completed, and is released to a logout station. As shown in step 146, the logout station first acquires the single piece that is the completed job and displays the appropriate control document. In step 148, the operator either approves the job, in which case it is sent out of the application and the job piece is deleted, or rejects the job, in which case it is released to another station for further processing.

As will be apparent from the preceding discussion, the RIS process is particularly well suited to paperless, electronic production systems in which the pieces, the final work product, and the control documents are all in electronic form and can be transmitted electronically between stations. However, it will be equally apparent that the RIS process can be used with any production system, including those in which pieces are physical objects and the control documents are maintained in paper form. The principles of the process are still applicable to manage the flow of the work.

Variables and Tables

The method tracks a number of control variables with which it monitors and controls the flow of pieces through the production system. These variables are maintained in a series of interrelated tables managed by relational database software of a type well known in the art. The variables and tables are described schematically below. A specific implementation of the tables defined in the format used by the DB2 version 2.1 software is illustrated in the Appendix attached hereto.

| | |
|---|---|
| TO_STATION | Used by the RELEASE_PIECE routine, it is the station type to which a piece goes when it is released. It can be the next station in the piece's route, the same station (indicating that the piece is not yet to be sent to another station) or a specified route station other than the next station. |
| TO_ROUTE | Also used by RELEASE_PIECE, it is the destination route to which a piece goes when it is released. |
| CURR_STATION_TYPE | Used to define a step in a route, it is linked with NEXT_STATION_TYPE to indicate the sequence in which a piece should move among the station types. |
| NEXT_STATION_TYPE | Used with CURR_STATION_TYPE to define a step in a route. |
| DEFAULT | A flag used to indicate which of several possible NEXT_STATION_TYPEs a piece should move to absent specific instruction to the contrary. |
| TRIGGER | A binary flag used for an operatorless, nonterminal station. If a piece enters the station it will trigger the station's operation. |

-continued

| | |
|---|---|
| STATION_TEXT | A holder for control parameters for the operation of a station. |
| DOC_ID | A unique identifier for a control document image. |
| TRANS | A transaction that an operatorless station executes when a piece is [released to it?] |
| ASSOC | A unique identifier for an association of pieces. |

| Variable Name | Description |
|---|---|
| APPL | A unique identifier for a application that makes calls ot the RIS routines. |
| PIECE | A unique identifier for a piece that is supplied to RIS when the application requests RIS to create the piece. |
| PIECE_TYPE | The type or category of a piece, taking one of a finite number of values supplied by the application and validated against a list of valid piece types for a given application. |
| OPCO | A unique company identifier used to control some aspects of the system's operation, such as whether a particular operator is permitted to work on pieces of jobs for a particular company. |
| ROUTE_TYPE | A unique identifier for a route through a subset of the stations of an application's system. |
| STATION_TYPE | An identifier for a type of station for a given application. |
| PRIORITY | A simple sort key used to sort pieces queued for operation by a particular station type. Priority is assigned to a piece when it is created, and may be changed during the system's operation. |
| LOCK | A binary flag indicating whether a particular piece is blocked from acquisition by a station. |
| ACQUIRED | A binary flag indicating whether a particular piece has been acquired by a station. |
| RELEASED | A binary flag indicating whether a particular piece has been released by a station. |
| OPERATOR | A unique identifier for the person operating a station. |
| FUNCTION | A holder for an option parameter passed into a RIS routine. |

PIECE_TB - The main table is the piece table PIECE_TB. Each row in the table contains values for several control variables for each piece in the system. These variables are listed in Table 1 below.

TABLE 1

| TABLE PIECE_TB |
|---|
| ACQUIRED |
| APPL |
| LOCK |
| OPCO |
| OPERATOR |
| PIECE |
| PIECE_TYPE |
| RELEASE |
| ROUTE_TYPE |
| STATION_TYPE |
| PRIORITY |

The variables relate generally to the identification of the piece and the job to which it pertains and the route the piece will follow through the application's production system.

PIECE_TYPE_TB—As shown in Table 2, this table identifies a type of piece PIECE_TYPE that can be used for an application APPL. The table is used to validate input to RIS from an application that specifies a route type; the input is not valid if there is no row in PIECE_TYPE_TB that has that PIECE_TYPE for that APPL.

TABLE 2

| TABLE PIECE_TYPE_TB |
|---|
| APPL |
| PIECE_TYPE |

ROUTE_TB—The routing table ROUTE_TB, shown in Table 3, specifies for a route type ROUTE_TYPE for a given application APPL and operating company OPCO that a piece proceeding along that route type will proceed from a first station type CURR_STATION_TYPE to a second station type NEXT_STATION_TYPE.

TABLE 3

| TABLE ROUTE_TB |
|---|
| APPL |
| OPCO |
| ROUTE_TYPE |
| CURR_STATION_TYPE |
| NEXT_STATION_TYPE |
| DEFAULT |

A route is thus defined by the sequence of CURR_STATION_TYPE and NEXT_STATION_TYPE entries in one or more rows of the ROUTE_TB table that have the same ROUTE_TYPE. It is also possible for a route to branch at one station type, optionally proceeding along one of several paths from that station. In this case, ROUTE_TB would have more than one row identical but for the final parameter, DEFAULT. The DEFAULT parameter is a binary flag that identifies the one NEXT_STATION_TYPE to which a piece on route ROUTE_TYPE should proceed from CURR_STATION_TYPE absent any contrary instruction from the application. The application may, however, direct that the piece proceed to one of other NEXT_STATION_TYPEs set forth in the table.

Another set of tables are used that are relatively static, serving to hold reference values accessed by the tables described above and used to validate input from the application to various RIS routines. The route type table ROUTE_TYPE_TB, shown in Table 4, identifies route types ROUTE_TYPE_TB for each company OPCO and application APPL.

TABLE 4

| TABLE ROUTE_TYPE_TB |
|---|
| APPL |
| OPCO |
| ROUTE_TYPE |

The station type table STATION_TYPE_TB, shown in Table 5, identifies for each application APPL a station type STATION_TYPE, a trigger parameter TRIGGER, and control parameters contained in STATION_TEXT that are passed to the station for its execution, and a transaction identifier TRANS.

TABLE 5

| TABLE STATION_TYPE_TB |
|---|
| APPL |
| STATION_TYPE |
| TRIGGER |

TABLE 5-continued

| TABLE STATION_TYPE_TB |
|---|
| STATION_TYPE |
| TRANS |

TRIGGER is a binary flag that is set for an operatorless station. During RIS operation, if a piece enters such a station, it triggers the station to take the required action and pass the piece to the next station type on the pieces route. The control parameters in STATION_TEXT control the station's operation, and can be used to invoke a piece of application software. TRANS identifies the application transaction to be invoked.

The application type table APPL_TYPE_TB, shown in Table 6 identifies for each application APPL the name of the application APPL_NAME.

TABLE 6

| TABLE APPL_TYPE_TB |
|---|
| APPL |
| APPL_TYPE |

The company type table OPCO_TYPE_TB, shown in Table 7, associates with each company identifier OPCO a company name COMPANY_NAME.

TABLE 7

| TABLE OPCO_TYPE_TB |
|---|
| OPCO |
| COMPANY_NAME |

The Imager portion of the RIS process maintains two tables to manage the images that are presented to a station operator when the station acquires the piece with which the image is associated. The document image table DOC_IMAGE_TB, shown in Table 8, associates with a document identifier DOC_ID an application transaction TRANS that is to be executed in connection with the document when it is scanned. This is discussed below in connection with the routine WAIT_FOR_SCAN.

TABLE 8

| TABLE DOC_IMAGE_TB |
|---|
| DOC_ID |
| TRANS |

The image/piece association table IMAGE_PIECE_ASSOC_TB, shown in Table 9, indexes the images maintained by RIS, associating with each piece PIECE in a given application APPL the appropriate document image, identified by document identifier DOC_ID, that should be presented to a station operator when the station acquires the piece.

TABLE 9

| TABLE IMAGE_PIECE_ASSOC_TB |
|---|
| DOC_ID |
| APPL |
| PIECE |

The Scheduler portion of the RIS method also maintains two tables used in associating pieces with each other. By associating the pieces, the priorities of individual pieces are overridden. As described above, two types of association are permitted. First, in work together association several pieces can be associated for purposes of having them worked on by the same operator. In this case, if a high priority piece has been presented to an operator and a low priority piece is associated with the high priority piece, the low priority piece will be presented to the operator before an unassociated piece of intermediate priority.

Second, in association for synchronization, pieces are brought together, and may be combined into a smaller number of pieces, at a particular station type. All must be present at such a station before they can be combined. The pieces can be associated with each other such that none of the pieces can be acquired by a station of that type until all of the pieces are available. The pieces are thus associated for purposes of synchronization at that station type.

RIS manages these two types of association through two tables: WORKWITH_ASSOC_TB and SYNC_ASSOC_TB. WORKWITH_ASSOC_TB, shown in Table 10, provides fields for the application identifier APPL, the piece identifier PIECE, and a unique association identifier code ASSOC. For work together association, the pieces in WORKWITH_ASSOC_TB having the same association identifier ASSOC are worked together by the same operator.

TABLE 10

| TABLE WORKWITH_ASSOC_TB |
|---|
| APPL |
| ASSOC |
| PIECE |

SYNC_ASSOC_TB, shown in Table 11, like WORKWITH_ASSOC_TB provides fields for the application identifier APPL, the piece identifier PIECE, and a unique association identifier code ASSOC; however, a STATION_TYPE must also be specified. For synchronization association, the pieces in SYNC_ASSOC_TB having the same association identifier ASSOC are collected and simultaneously released to the same operator.

TABLE 11

| TABLE SYNC_ASSOC_TB |
|---|
| APPL |
| ASSOC |
| STATION_TYPE |
| PIECE |

For association for synchronization, all pieces in SYNC_ASSOC_TB having the same value for ASSOC will be synchronized at the designated STATION_TYPE.

Routines

As described above, the RIS method employs a set of operation sequences, or routines. Each routine performs a discrete aspect of the overall method and can be combined in varying ways to perform the necessary operations of the method. An application makes calls to the routines at various points in the application's production process to request RIS to perform specific operations. RIS routines can also make calls to other RIS routines. These routines are described below.

The routines require that the system on which RIS operates provide certain services. First, several routines require the identity of the operator of a particular station, for example to coordinate a work together association. It is well known in the art for a system to identify a system user, such as by a user identification that the user must supply before accessing the system. Second, because RIS is suited for operation on a system in which it may operate concurrently with applications and other tasks, i.e. in a multitasking environment, the routines require the system to provide the ability to allocate some data or portion of the system's resources to the temporarily exclusive use of RIS. This capability is well known in the art. In the routine descriptions below, the term Enque (or ENQ) is used to indicate that the routine requests the system to allocate the indicated data or resource to it. The term Deque (or DEQ) indicates that the routine relinquishes control over the data or resource.

Figure 3:
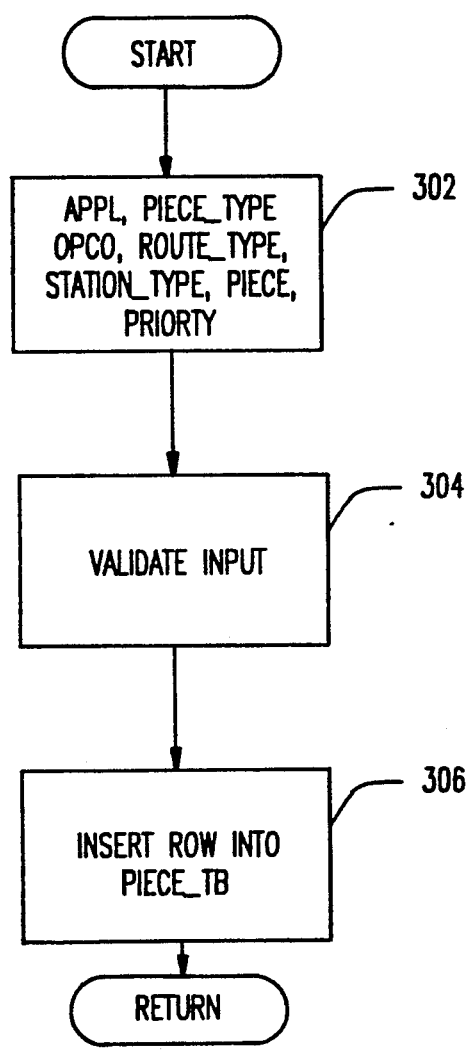
FIG. 3 is a schematic representation of a routine employed in the operation of the invention in which a piece of work is created.

CREATE_PIECE—This routine enters a new piece into an application's production system by creating new data records for the piece within the piece table PIECE_TB and associating a control document image with the new piece in the piece/image association table IMAGE_PIECE_ASSOC_TB. It works with the variables APPL, PIECE_TYPE, OPCO, ROUTE_TYPE, STATION_TYPE, PIECE, and PRIORITY passed from the application at step 302. As shown schematically in FIG. 3 and in pseudo code in Table 12, the routine first validates the input values at step 304.

TABLE 12

| ROUTINE CREATE_PIECE |
|---|
| /* INPUT: PIECE_TYPE, OPCO, ROUTE_TYPE, STATION_TYPE, APPL, PIECE, PRIORITY /* |
| Validate input |
| Insert row into PIECE_TB |

In the illustrated embodiment, this is done by comparing the input values to the tables of legal values for the variables described above. Then, at step 306 the routine inserts a new row into the piece table PIECE_TB, filling it with the newly-supplied control data. This includes the route type that the piece is to follow and the station type at which the piece should begin the route.

Figure 4A:
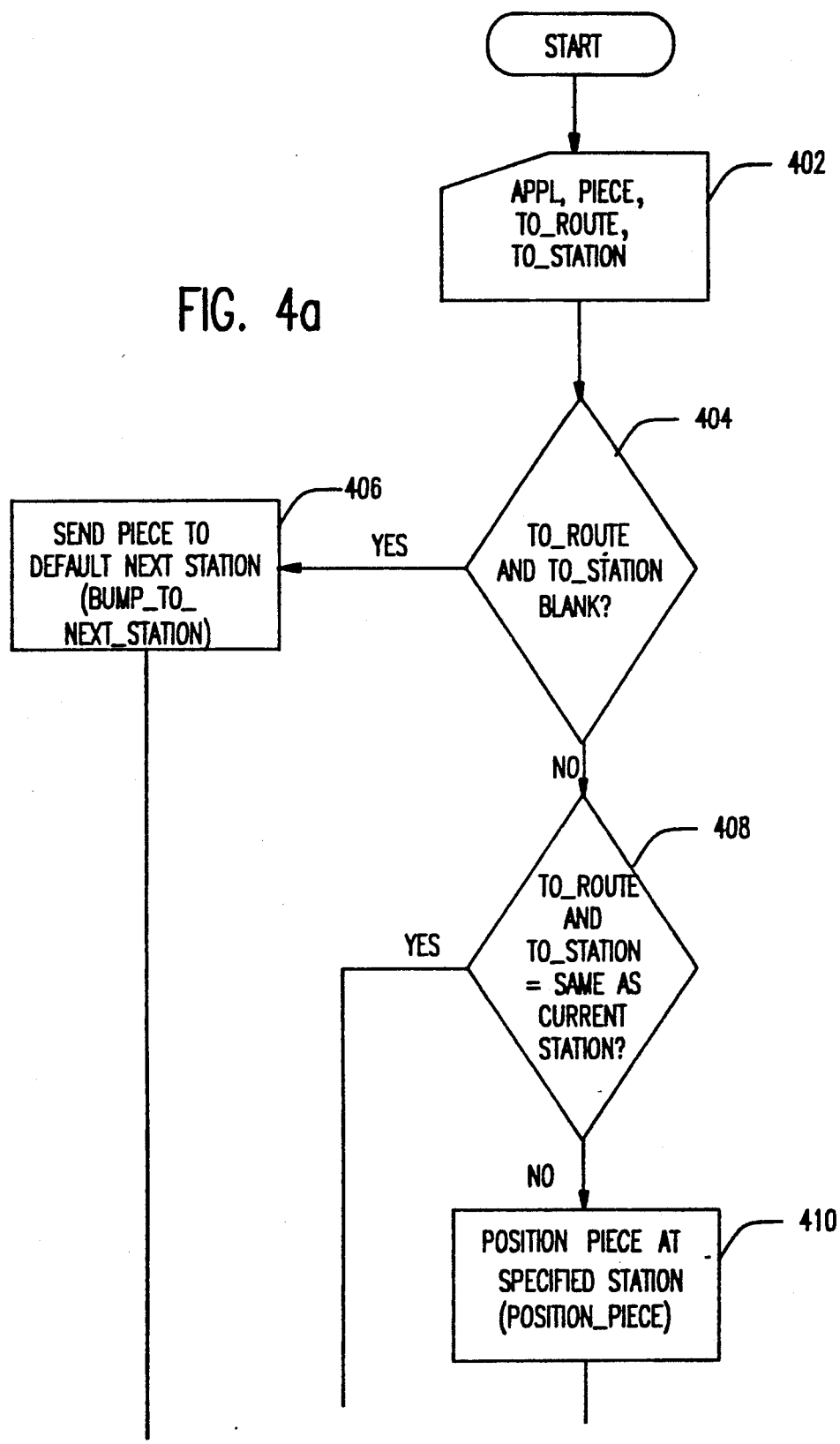
Figure 4C:
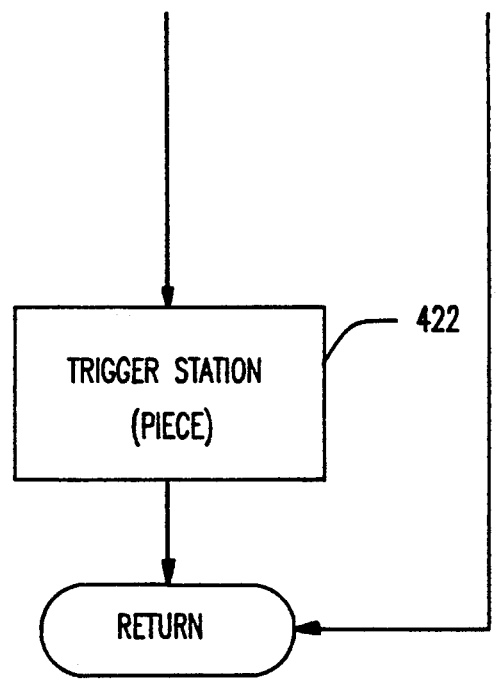

RELEASE_PIECE—This routine designates the station to which a piece should proceed and identifies the piece as being available for that station to operate on. It works with the variables APPL, PIECE, TO_ROUTE, and TO_STATION passed to it from the application. As shown schematically in FIGS. 4a to 4c and in pseudo code in Table 13, the routine first tests the values of TO_ROUTE and TO_STATION in steps 404 and 408.

TABLE 13

| ROUTINE RELEASE_PIECE |
|---|
| /* INPUT: APPL, PIECE, TO_ROUTE, TO_STATION /* |
| If TO_ROUTE and TO_STATION are blank then |
|    call BUMP_TO_NEXT_STATION (APPL, |
|    PIECE, STATION_TYPE) |
| Else if TO_ROUTE = current ROUTE_TYPE |
|    and TO_STATION = current STATION_TYPE, then NOP |
|    Else call POSITION_PIECE (APPL, PIECE, |
|    ROUTE_TYPE, STATION_TYPE) |
| ENQ PIECE_TB |
| Set PIECE RELEASED |
| If every associated piece is released then for each associated piece do |
|    reset APPL, PIECE RELEASED |
|    reset APPL, PIECE ACQUIRED |
|    call UNLOCK (APPL, PIECE) |
|    if APPL, PIECE STATION_TYPE should be triggered, then |
|       TRIGGER_STATION (PIECE) |

TABLE 13-continued
ROUTINE RELEASE_PIECE

```
    end do
DEQ PIECE_TB
```

If both parameters contain no value, in step 406 the routine calls the routine BUMP_TO_NEXT_STATION, described below, so that the piece will proceed to its default next station as identified in the routing table ROUTE_TB. In step 408, if the value of TO_ROUTE corresponds to the route type on which the current station lies, and the value of TO_STATION corresponds to the station type of the current station, this indicates that the application is instructing RIS to have the piece remain at the current station. It therefore performs no operation.

If the values of TO_ROUTE and TO_STATION meet neither of these tests, then in step 410 the routine calls the routine POSITION_PIECE to position the piece at a station type identified in TO_STATION on the route specified in TO_ROUTE.

The routine next requests the operating system to enque the piece table PIECE_TB and in step 412 sets the PIECE as released. In step 414 the routine tests to determine if every piece associated with the specified piece is released. If so, the routine repeats steps 416 to 422 for each associated piece. In step 416, the flags RELEASED and ACQUIRED are reset for the piece and the piece is unlocked. In step 420, the routine tests whether the release of the associated piece should trigger the next station on that piece's route. If so, in step 422 the routine triggers that station.

Figure 5A:
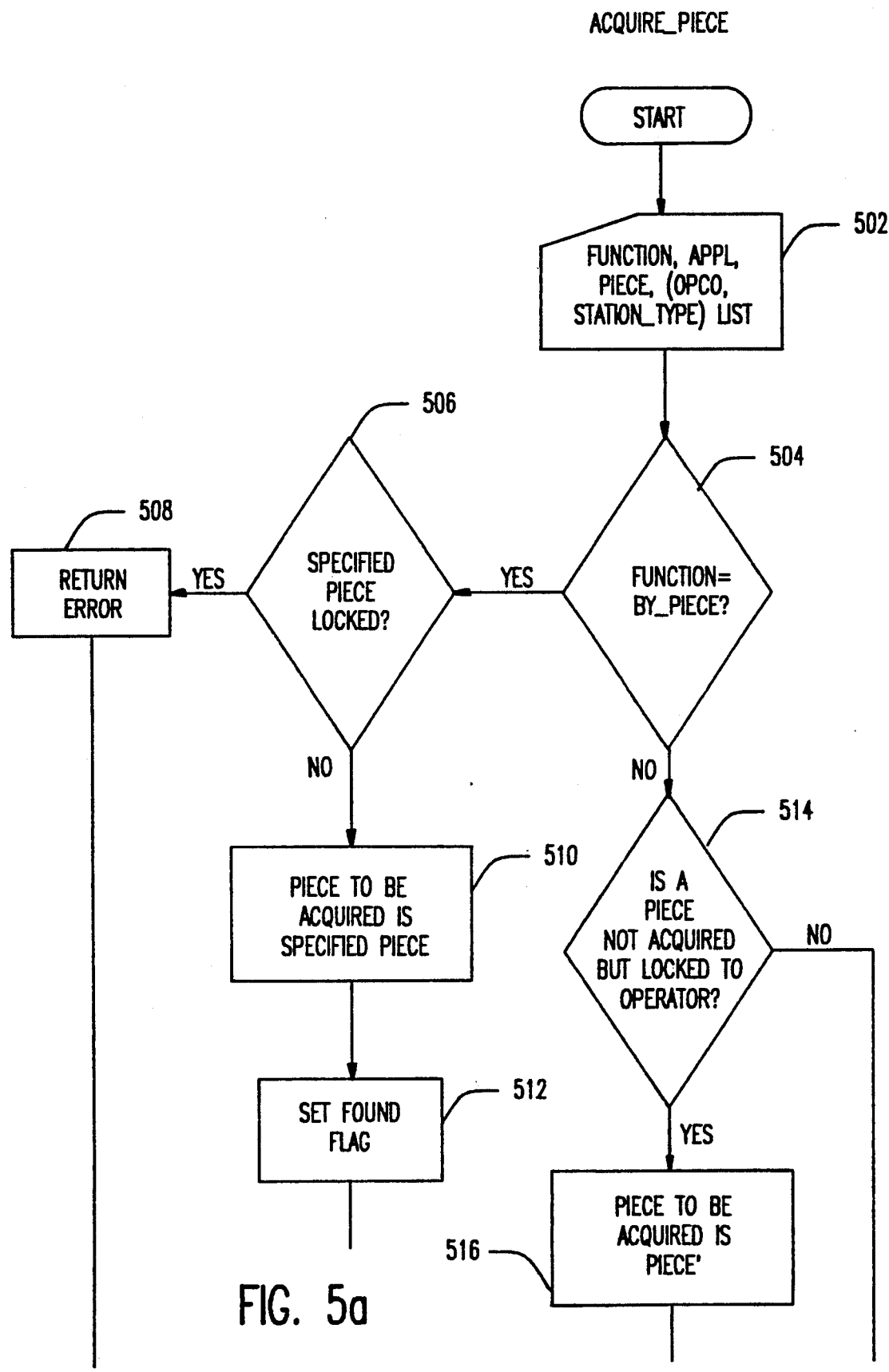
FIGS. 5a to 5c are a schematic representation of a routine employed in the operation of the invention in which a piece of work is acquired by a station.
Figure 5B:
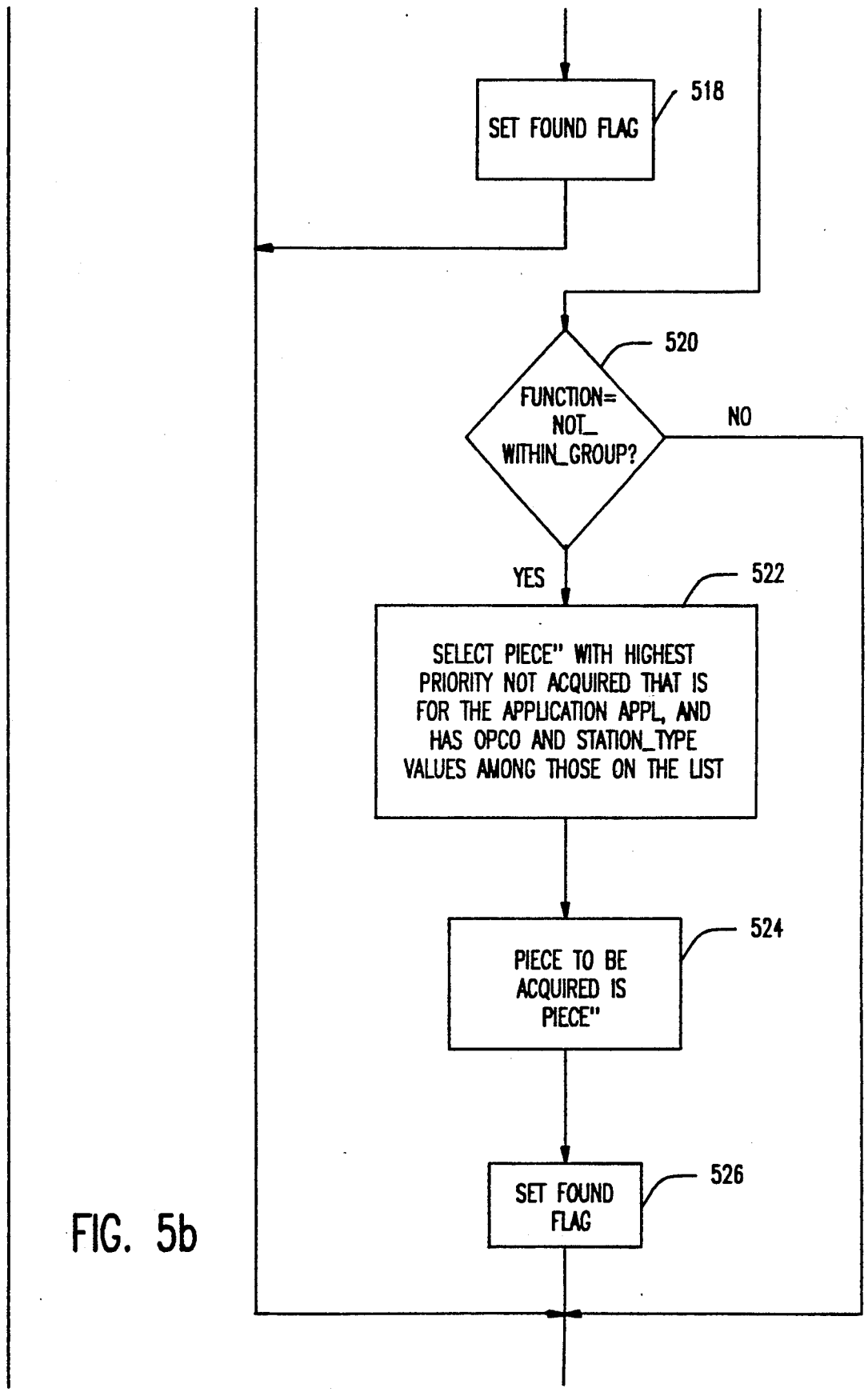
Figure 5C:
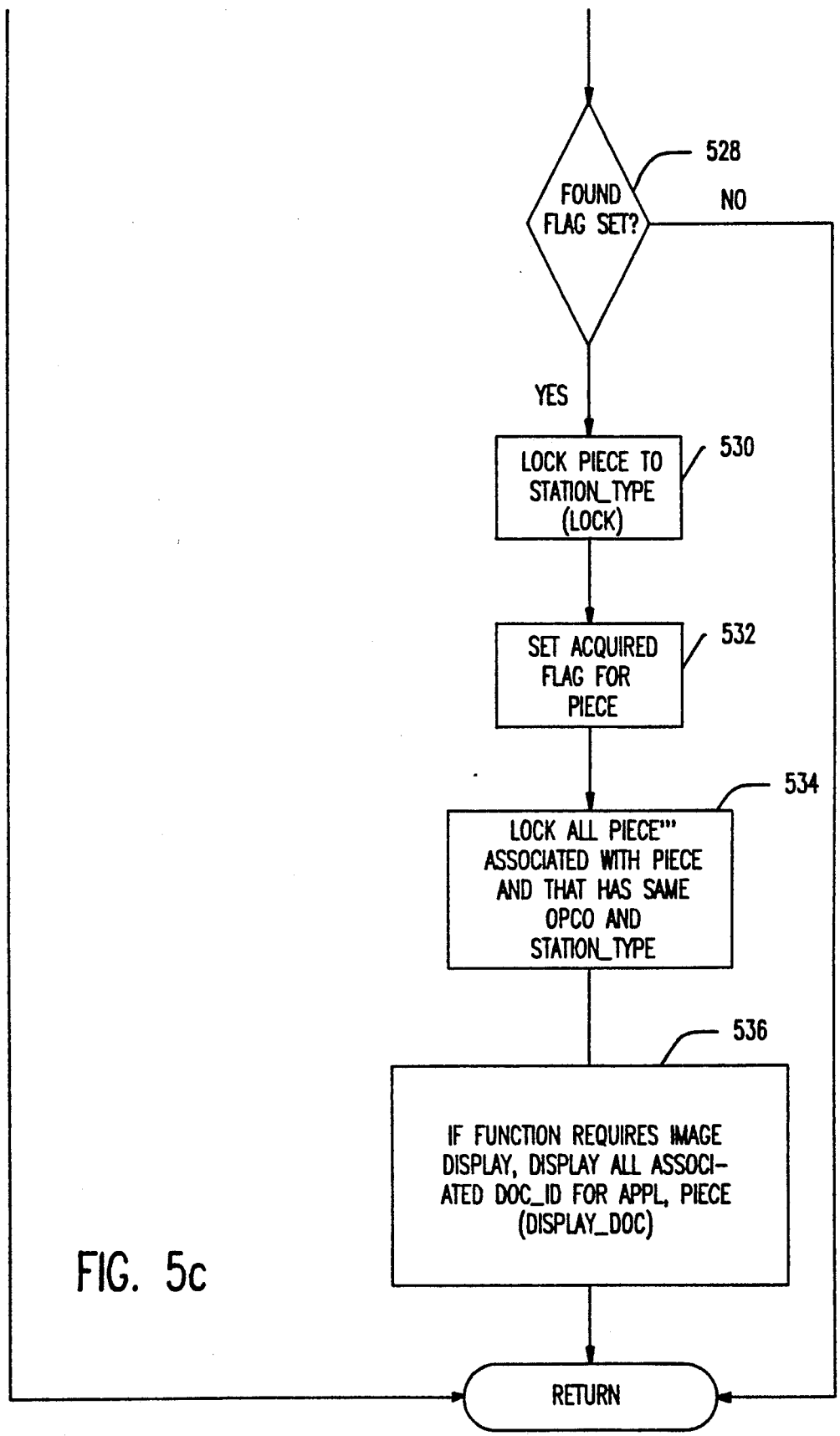

ACQUIRE_PIECE—This routine identifies the next piece that a station should acquire to perform work on. It works with the variables FUNCTION, APPL, PIECE, and a list (OPCO, STATION_TYPE) LIST passed to it by the application. As shown schematically in FIGS. 5a to 5c and in pseudo code in Table 14, the routine first tests the value of the parameter FUNCTION in step 504.

TABLE 14
ROUTINE ACQUIRE_PIECE

```
/* INPUT: FUNCTION, APPL, PIECE, (OPCO,
STATION_TYPE) LIST /*
if function = BY_PIECE
    if locked to other operator => error
    else PIECE = specified PIECE, set found flag
else if any non-acquired piece' is locked for operator
    PIECE = piece', set found flag
else if FUNCTION = NOT_WITHIN_GROUP,
    do
        ENQ PIECE_TB
        Select piece" of highest priority where piece" is not
        acquired
/* not necessarily associated to acquired piece */
        and piece".appl = APPL
        and (piece".OPCO, piece".STATION_TYPE) ∈
            (OPCO, STATION_TYPE)LIST
        PIECE = piece".PIECE
        set found flag
    enddo
if found
    do
        Call LOCK (APPL, PIECE)
        set ACQUIRED (APPL, PIECE)
        for each piece'" where piece'" is associated with PIECE
        in
        this APPL
        and (piece".OPCO, piece".STATION) = (piece".OPCO,
        piece".STATION)
            lock (APPL, PIECE)
```

TABLE 14-continued
ROUTINE ACQUIRE_PIECE

```
    enddo
DEQ PIECE_TB
if FUNCTION allows DISPLAY_DOC, then
    if found for each DOC_ID
    associated in IMAGE_ASSOC_TB, call
    DISPLAY_DOC (DOC_ID, OPERATOR)
return (found/not found status, PIECE)
```

If FUNCTION is equal to BY_PIECE, the application is indicating that RIS should set the piece specified in the input parameters as acquired, unless the piece is already locked to another operator. Therefore, in step 506 the routines tests whether the specified piece is locked to another operator. If so, the routine returns an error code to the application in step 508. If not, the routine identifies the specified piece as the selected piece in step 510 and sets a "found" flag to indicate that a piece has been found in step 512.

If the value of FUNCTION is not equal to BY_PIECE, the routine searches in step 514 for a non-acquired piece' that is locked to the operator. If there is one, the routine identifies the piece' as the selected piece in step 516 and sets the found flag in step 518.

If the value of FUNCTION is equal to NOT_WITHIN_GROUP, the application is indicating that the normal piece priorities by which the piece for the station to acquire would be determined should be overridden. That is, if the station has queued to it a set of pieces that are work together associated, the station would normally take the next piece from that work together association in the queue regardless of that piece's priority. In this case, however, the piece with the next highest priority of all pieces that the station is eligible to work on is selected for work. Thus, in step 520 the routine determines if FUNCTION is equal to NOT_WITHIN_GROUP. If so, then in step 518, the routine selects from the pieces in the piece table PIECE_TB the highest priority piece piece" that is not acquired, that is for the application that called the routine, and that has values for its OPCO and STATION_TYPE variables that are found in (OPCO, STATION_TYPE) LIST. If it finds such a piece", it identifies this piece as the specified PIECE in step 524 and sets the found flag in step 526.

If a piece is found by one of these three tests, i.e., if the found flag is set as tested in step 528, the routine first in step 530 locks the selected PIECE to the indicated STATION_TYPE by calling the LOCK routine. It then sets the ACQUIRED flag for PIECE in the piece table PIECE_TB in step 532 and locks all associated pieces piece'" that are associated with PIECE and that have the same operating company code OPCO and station type code STATION_TYPE in step 534. Finally, if the function requests the display of associated control document images, all images associated with the selected pieces are transmitted in step 536 to the operator by calling the DISPLAY_DOC routine.

Figure 6:
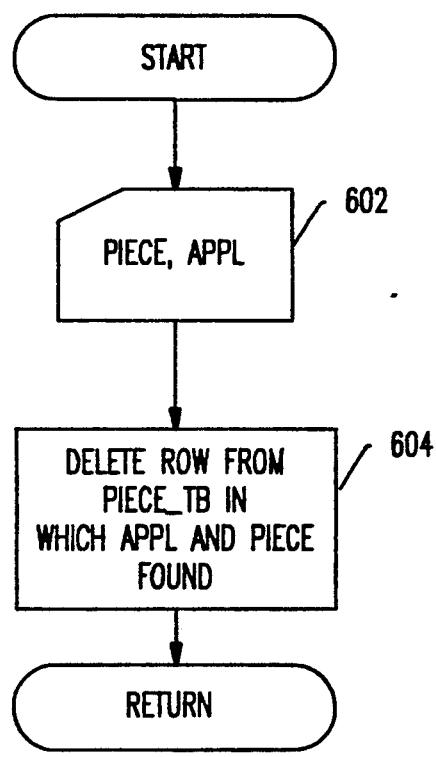
FIG. 6 is a schematic representation of a routine employed in the operation of the invention in which a piece is deleted.

DELETE_PIECE—This routine removes a specified piece from the system. The routine can be invoked when two or more pieces are combined to form a new piece; there is no longer a need to track the old pieces. It works with the variables PIECE and APPL. As shown schematically in FIG. 6 and in pseudo code in Table 15, the routine simply deletes at step 604 the row from the piece table PIECE_TB that contains the specified PIECE and APPL identifiers.

TABLE 15
ROUTINE DELETE_PIECE
/* INPUT: PIECE, APPL /*
Delete row from PIECE_TB containing PIECE and APPL BUMP_TO_NEXT_STATION—This routine identifies the next station to which a piece should be sent. It works with the variables APPL and PIECE. As shown schematically in FIG. 7 and in pseudo code in Table 16, the routine first builds at step 704 a list of stations on the piece's route from the route table ROUTE_TB.

TABLE 16
ROUTINE BUMP_TO_NEXT_STATION
/* INPUT: APPL, PIECE, TO_STATION_TYPE /*
/* OUTPUT INCLUDES: STATION_TYPE */
Build a list of stations on this route from ROUTE_TB based on the APPL piece's current station type
If TO_STATION is blank then use the one default NEXT_STATION_TYPE in the list ot set STATION_TYPE
Else if TO_STATION is in the list as the next station type, set STATION_TYPE = TO_STATION
else error /* piece will not be moved */
Update STATION_TYPE in PIECE_TB for PIECE with the next station type Based on the station type of the station where the piece is currently located, the routine tests at step 706 whether TO_STATION has a value. If it is blank, then at step 708 the routine tests whether there is a unique default NEXT_STATION_TYPE in the ROUTE_TB table. If not, the routine returns an error message at step 710. If so, then it updates at step 712 the station type variable STATION_TYPE in the piece table PIECE_TB for PIECE with the identity of the next station type NEXT_STATION_TYPE.

If TO_STATION is not blank, the routine tests in step 714 whether the designated TO_STATION is among the NEXT_STATION_TYPE values listed in ROUTE_TB. If not, the routine returns an error message at step 716. If so, the routine updates the station type variable in step 712.

Figure 8A:
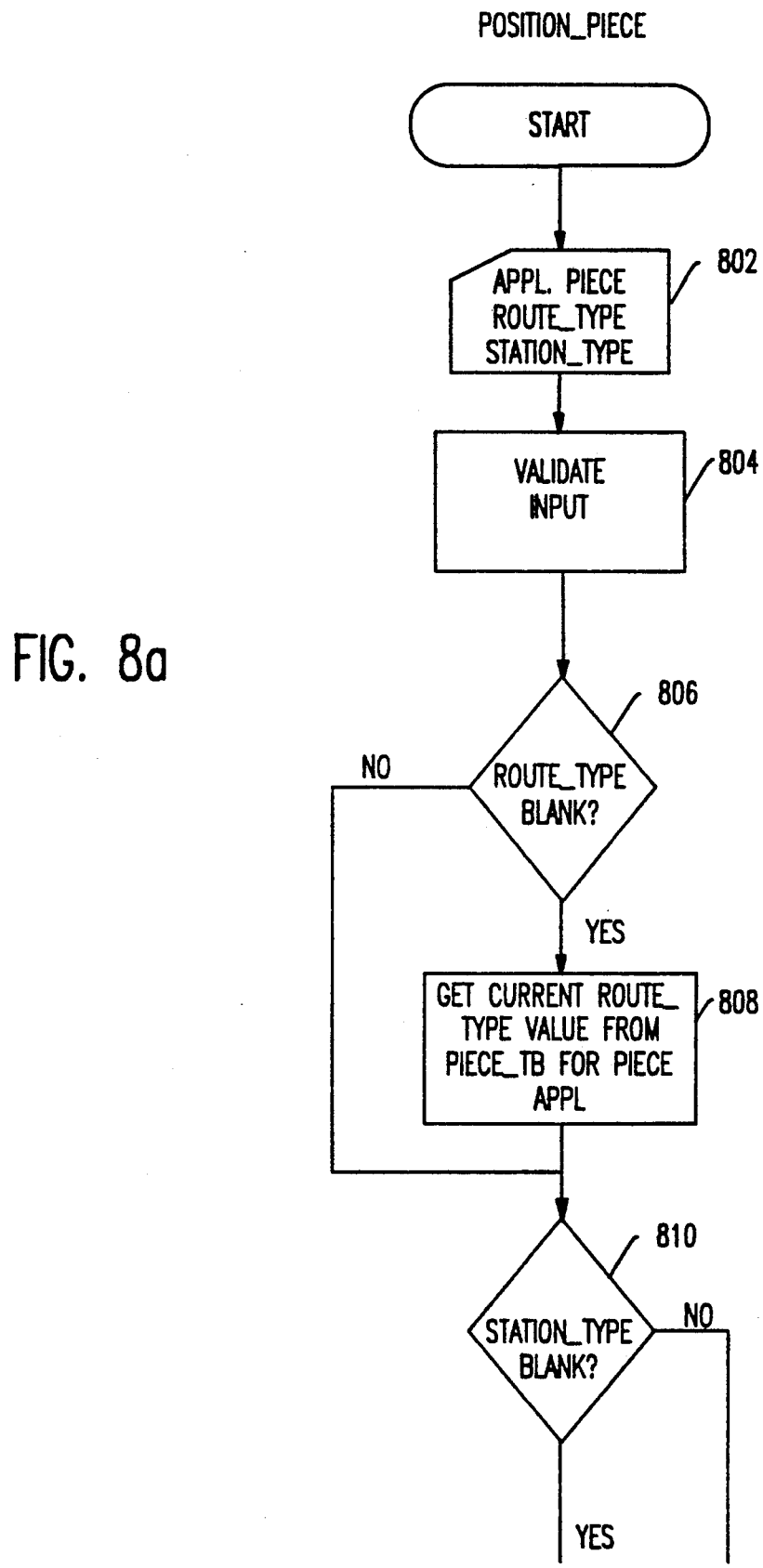
FIGS. 8a and 8b are a schematic representation of a routine employed in the operation of the invention in which a piece is positioned to a specified station.
Figure 8B:
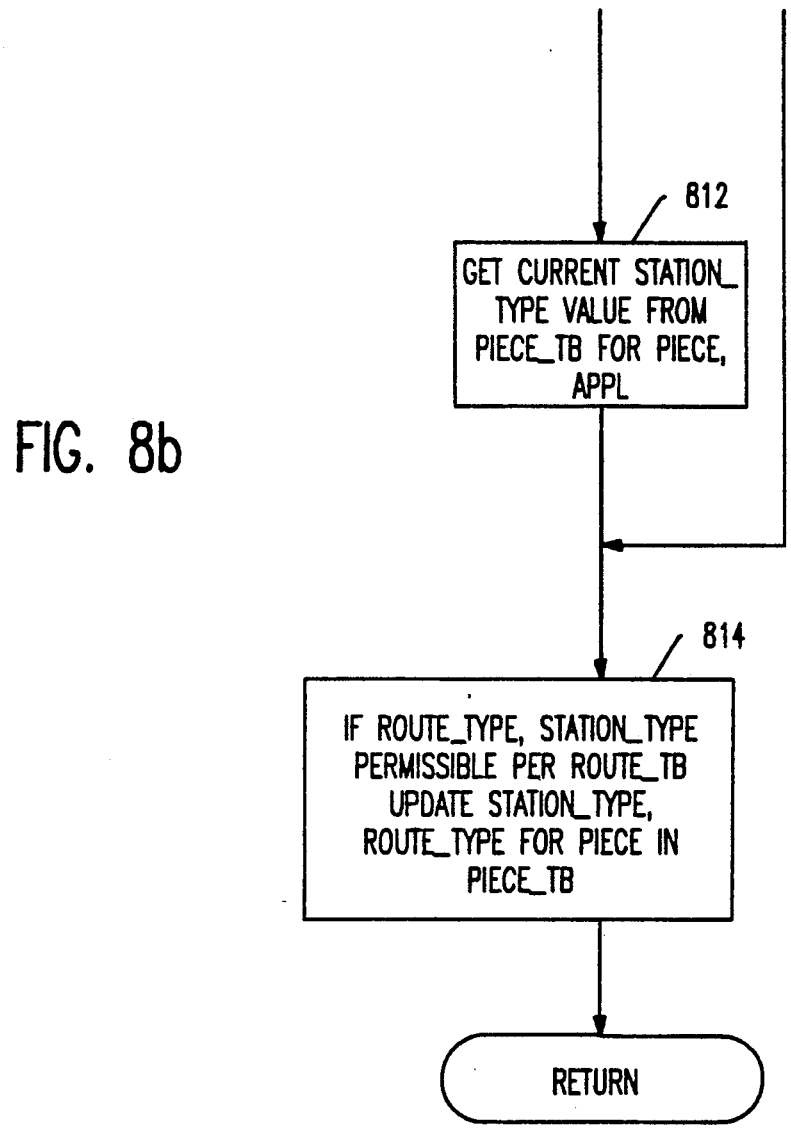

POSITION_PIECE—This routine positions a piece to a particular station type on its route. It works with the variables APPL, PIECE, ROUTE_TYPE, and STATION_TYPE. As shown schematically in FIG. 8a and 8b and in pseudo code in Table 17, the routine first validates at step 804 the input from the application. The routine then tests whether the ROUTE_TYPE input has a value in step 806.

TABLE 17
ROUTINE POSITION_PIECE
/* INPUT INCLUDES: APPL, PIECE, ROUTE_TYPE, STATION_TYPE */
Validate input
If ROUTE_TYPE is blank, then get current value of ROUTE_TYPE from
PIECE_TB for APPL, PIECE
If STATION_TYPE is blank, get current value of STATION_TYPE from PIECE_TB
for APPL, PIECE
If ROUTE_TYPE, STATION_TYPE are permissible according to PIECE_TB, the update STATION_TYPE for PIECE in ROUTE_TB with input values If so, then in step 808 the routine extracts the current value of ROUTE_TYPE in the ROUTE_TB table for PIECE, APPL. If the input ROUTE_TYPE is blank, then in step 810 the routine updates the value of ROUTE_TYPE for PIECE in the PIECE_TB table with the input value.

The routine then tests whether the STATION_TYPE input has a value in step 812. If so, then in step 814 the routine extracts the current value of STATION_TYPE in the ROUTE_TB table for PIECE, APPL. If the input STATION_TYPE is blank, then in step 816 the routine updates the value of STATION_TYPE for PIECE in the PIECE_TB table with the input value.

Figure 9:
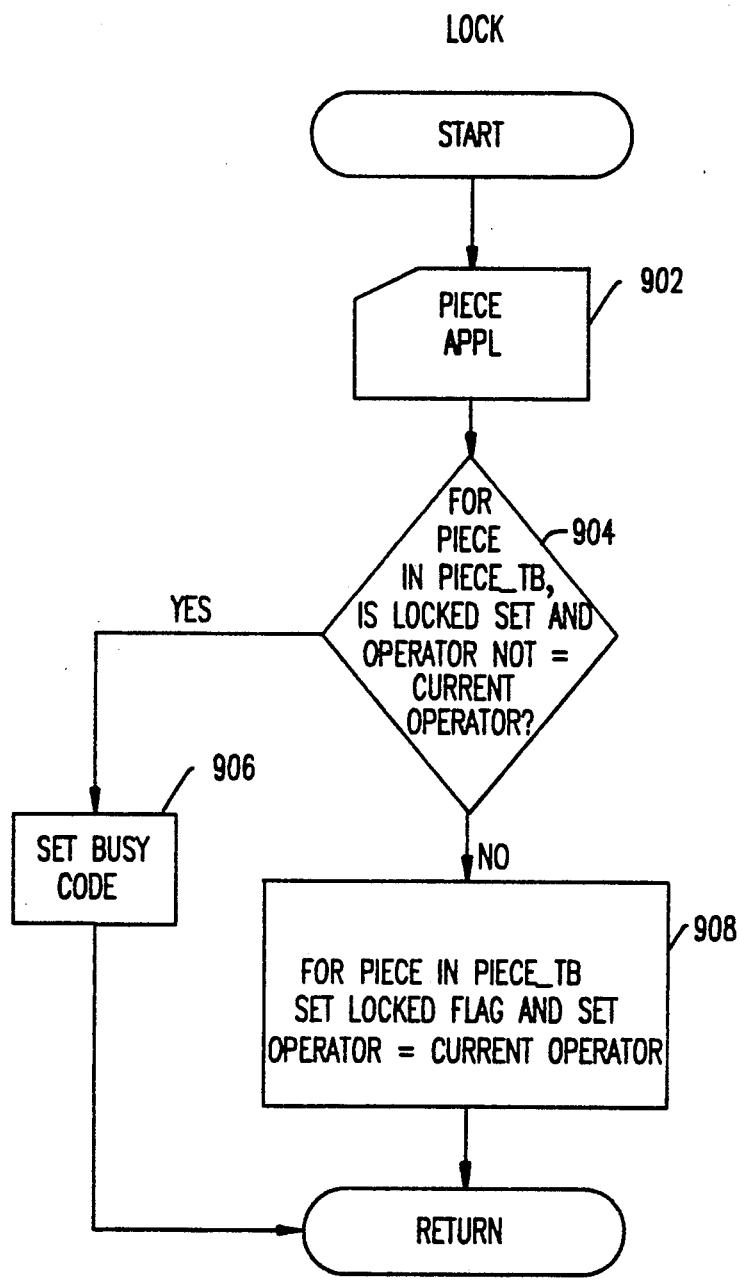
FIG. 9 is a schematic representation of a routine employed in the operation of the invention in which a piece is marked as locked.

LOCK—This routine sets the LOCKED flag for a specified piece, indicating that the piece is not available for another station. It works with the variables PIECE and APPL. As shown schematically in FIG. 9 and in pseudo code in Table 18, the routine first tests at step 904 whether the variable LOCKED is set for the selected PIECE in PIECE_TB and the OPERATOR variable holds the identity of the current operator. If so, the routine returns a busy code at 906.

TABLE 18
ROUTINE LOCK
/* INPUT INCLUDES: APPL, PIECE */
If LOCKED set and OPERATOR ≠ current operator identity
for PIECE in PIECE_TB, then return busy code
Set LOCKED flag and update OPERATOR for PIECE in
PIECE_TB to lock to current operator If the piece is not locked to another station, or is already locked to the station from which the inquiry originates, then the piece is marked as being locked to the originating station in step 908 by setting the LOCK flag in the piece table PIECE_TB for PIECE and by setting the OPERATOR variable equal to the identity of the current operator.

Figure 10:
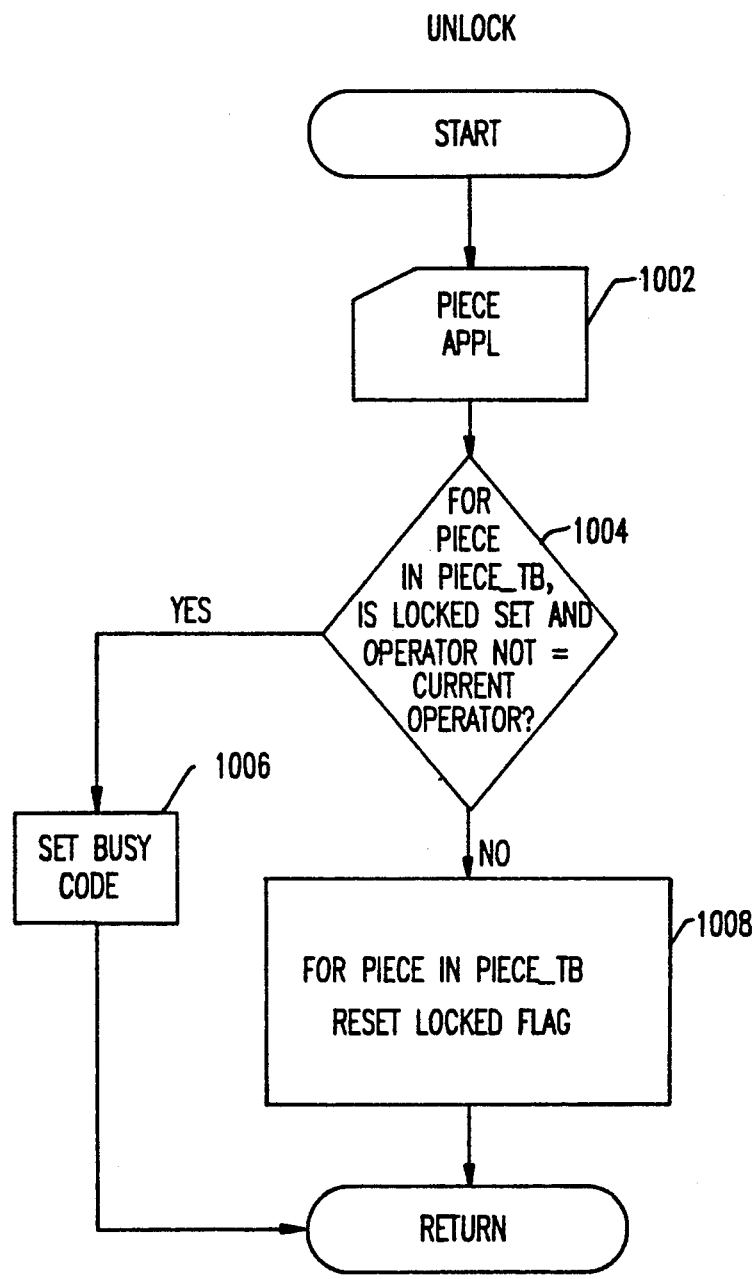
FIG. 10 is a schematic representation of a routine employed in the operation of the invention in which a locked piece is unlocked.

UNLOCK—This routine performs the inverse of the LOCK function. It also works with the variables PIECE and APPL. As shown schematically in FIG. 10 and in pseudo code in Table 19, the routine first tests at step 1004 whether the variable LOCKED is set for the selected PIECE in PIECE_TB and the OPERATOR variable holds the identity of the current operator. If so, the routine returns a busy code at step 1006.

TABLE 19
ROUTINE UNLOCK
/* INPUT INCLUDES: APPL, PIECE */
If LOCKED set and OPERATOR ≠ current operator identity
for PIECE in PIECE_TB, then return busy code
Reset LOCKED flag for PIECE in PIECE_TB If the piece is not locked to another station, or is already locked to the station from which the inquiry originates, then the piece is marked as being unlocked in step 1008 by resetting the LOCK flag in the piece table PIECE_TB for PIECE.

Figure 11:
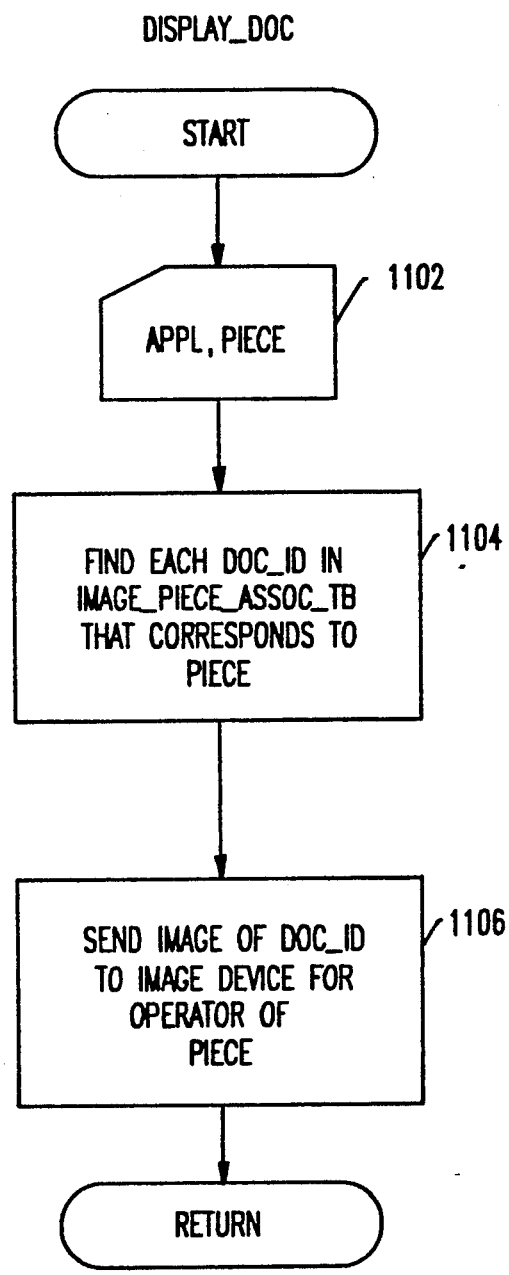
FIG. 11 is a schematic representation of a routine employed in the operation of the invention in which an image of a control document is displayed to a station operator.

DISPLAY_DOC—This routine calls up an image of the job order or other job control document and presents it to a station operator when the piece to which the control document corresponds is presented to the station. It works with the variables APPL and PIECE. As shown schematically in FIG. 11 and in pseudo code in Table 20, the routine in step 1104 first looks up the DOC_ID corresponding to the identified piece in the image/piece association table IMAGE_PIECE_ASSOC_TB. The routine then sends in step 1106 the image identified by DOC_ID to the station at which the operator identified in the variable OPERATOR of PIECE in PIECE_TB is working.

TABLE 20

ROUTINE DISPLAY_DOC

/* INPUT INCLUDES: APPL, PIECE */
Select each DOC_ID that corresponds to PIECE from IMAGE_PIECE_ASSOC_TB
Send image corresponding to DOC_ID to image device for OPERATOR of PIECE In an operating environment in which at least some of the control documents are retained in paper form or in which not every operator works at a station at which an image can be displayed a paper facsimile of the image or of the original paper control document can be presented to the station rather than the image.

Figure 2:
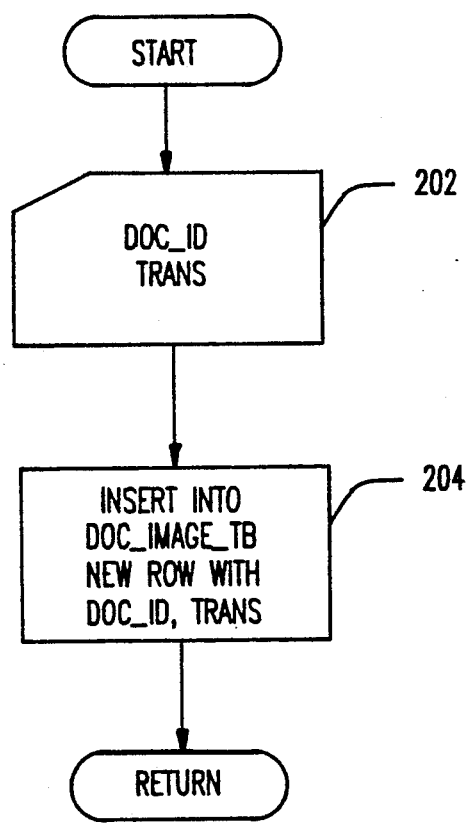
FIG. 2 is a schematic representation of a routine employed in the operation of the invention in which a station awaits a scanned document.

WAIT_FOR_SCAN—This routine authorizes the creation of a new document and issues a instruction for an application transaction to occur when the scan is made. It works with the input variables DOC_ID and TRANS, passed from the application in step 202. As shown schematically in FIG. 2 and in pseudo code in Table 21, in step 204 the routine authorizes the creation of a new document with the identification code DOC_ID by issuing a call to an image storage station. It then in step 206 inserts into the document image table DOC_IMAGE_TB a new row containing DOC_ID and TRANS. TRANS holds the identifier for an application transaction that is to be invoked when the scan is completed.

TABLE 21

ROUTINE WAIT_FOR_SCAN

Figure 21:
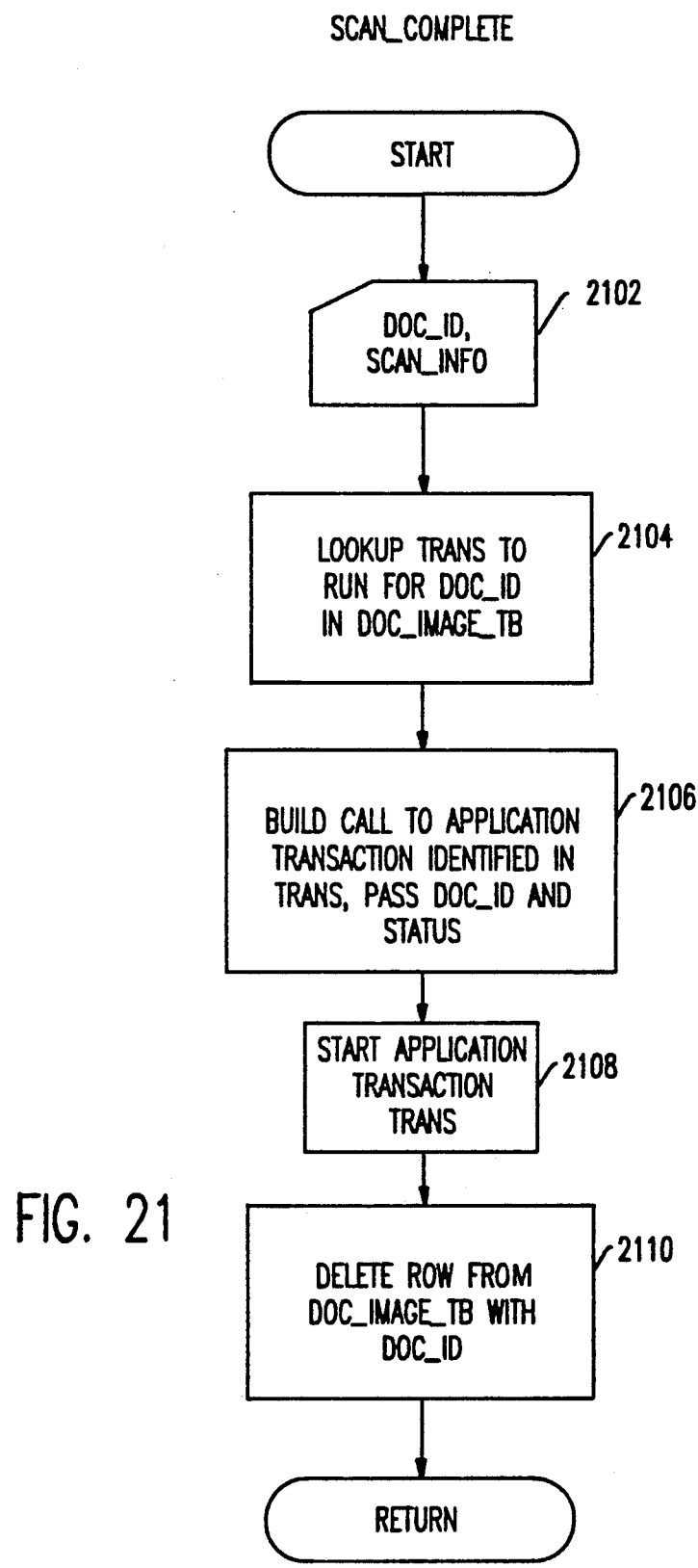
FIG. 21 is a schematic representation of a routine employed in the operation of the invention in which an application transaction is invoked the association for synchronization among a group of pieces is eliminated.

/* INPUT: DOC_ID, TRANS /*
Authorize creation of a new document, DOC_ID via call to image storage station
Insert into DOC_IMAGE_TB a new row with DOC_ID and TRANS SCAN_COMPLETE—This routine is a background routine for general scan completion that is triggered by the completion of a scan for a DOC_ID belonging to the system as specified in WAIT_FOR_SCAN. It works with the input variables DOC_ID and SCAN_INFO. As shown schematically in FIG. 21 and in pseudo code in Table 22, in step 2104 the routine looks up the transaction TRANS to run for the specified DOC_ID in DOC_IMAGE_TB. It then creates a standard initiation call in step 2106 for the specified application transaction, passing the DOC_ID and scan information SCAN_INFO. In step 2108 it triggers the application transaction, and in step 2110 it deletes from DOC_IMAGE_TB the row with DOC_ID.

TABLE 22

ROUTINE SCAN_COMPLETE

/* INPUT: DOC_ID, SCAN_INFO */
Lookup TRANS to run for DOC_ID in DOC_IMAGE_TB
Build standard call to application transaction specified in TRANS, passing DOC_ID and SCAN_INFO
Trigger application transaction TRANS
Delete row from DOC_IMAGE_TB with DOC_ID The application transaction that is initiated by SCAN_COMPLETE would follow the steps of looking up in IMAGE_PIECE_ASSOC_TB all pieces associated with DOC_ID, acquiring all of the pieces, updating the status of a piece for which an error is received (i.e., for which a scan was unsuccessful), and releasing the piece to the next station.

Figure 12:
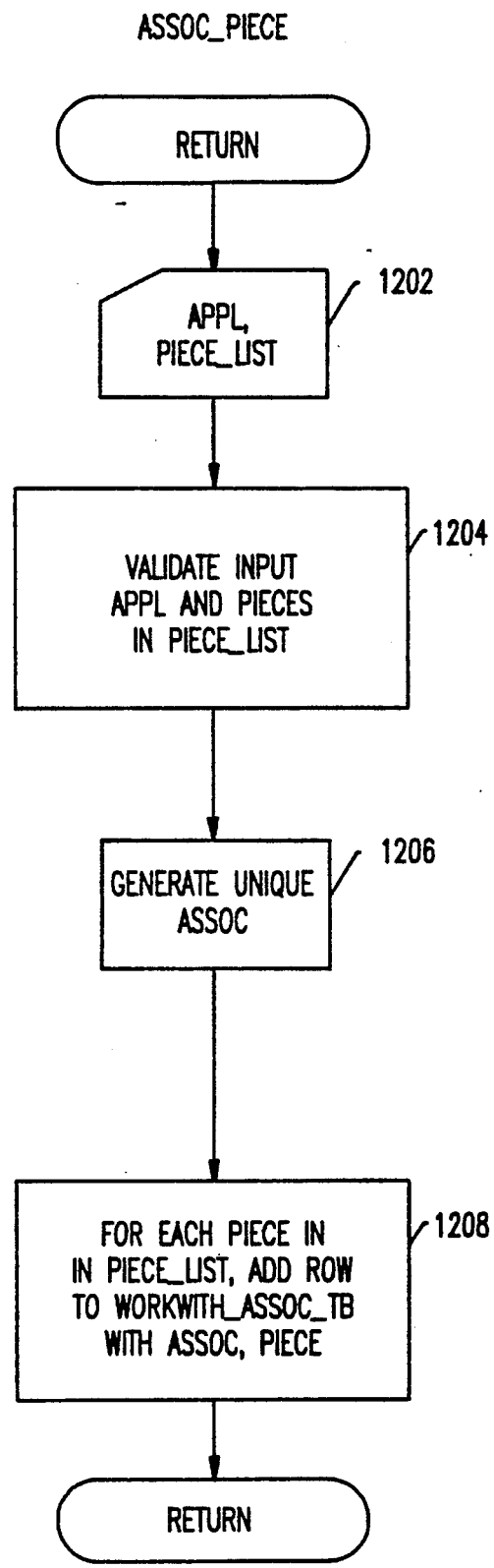
FIG. 12 is a schematic representation of a routine employed in the operation of the invention in which pieces of work are associated with each other for purposes of operation by a station.

ASSOC_PIECE—This routine associates pieces with each other in a work together association. It works with the variables APPL and a list of pieces to be associated (PIECE)LIST supplied by the application. As shown schematically in FIG. 12 and in pseudo code in Table 23, the routine at step 1204 first validates the input from the application by confirming that APPL and each PIECE is present in the routing table ROUTE_TB.

TABLE 23

ROUTINE ASSOC_PIECE

/* INPUT INCLUDES: APPL, (PIECE)LIST */
/* OUTPUT INCLUDES: ASSOC */
Validate input APPL and each PIECE in (PIECE)LIST in PIECE_TB
Generate unique ASSOC
Do while (another PIECE in (PIECE)LIST)
    Insert row with ASSOC, PIECE into WORKWITH_ASSOC_TB
Enddo The routine then generates in step 1206 a unique association number. Finally, for each piece in the identified (PIECE)LIST the routine generates in step 1208 a row in the WORKWITH_ASSOC_TB table that includes the ASSOC and the PIECE identifiers.

Figure 13:
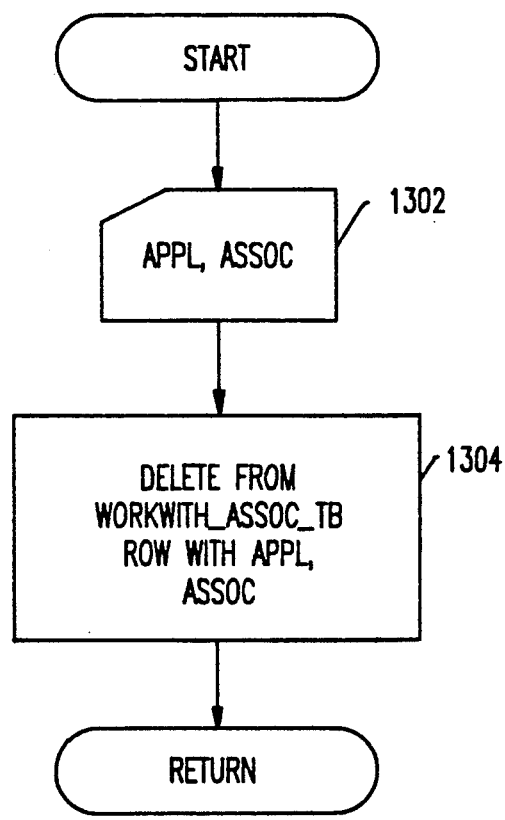
FIG. 13 is a schematic representation of a routine employed in the operation of the invention in which an association between pieces is deleted.

DEL_ASSOC_PIECE—This routine performs the inverse of ASSOC_PIECE in that it deletes from the WORKWITH_ASSOC_TB table a specified workwith association identified by ASSOC for an input APPL. As shown schematically in FIG. 13 and in pseudo code in Table 24, the routine at step 1304 simply

TABLE 25

ROUTINE SYNC

/* INPUT INCLUDES: APPL, PIECE */
Select all distinct ASSOC form SYNC_ASSOC_TB that contain this PIECE and APPL
Do while (another ASSOC)
    If (all PIECEs in SYNC_ASSOC_TB for this ASSOC are at this station)
    then
        Move each PIECE in this ASSOC to the next station
        Delete all rows for this ASSOC from SYNC_ASSOC_TB
    Endif
Enddo then, in step 1408 for each ASSOC, the routine determines if all of its associated pieces are at the current station. If so, in step 1410 it moves each of the associated pieces to the next station using the BUMP_TO_NEXT_STATION routine and in step 1412 deletes the corresponding rows from the SYNC_ASSOC_TB table. deletes from WORKWITH_ASSOC_TB the row containing the specified APPL and ASSOC.

TABLE 24

ROUTINE DEL_ASSOC_PIECE

Figure 14A:
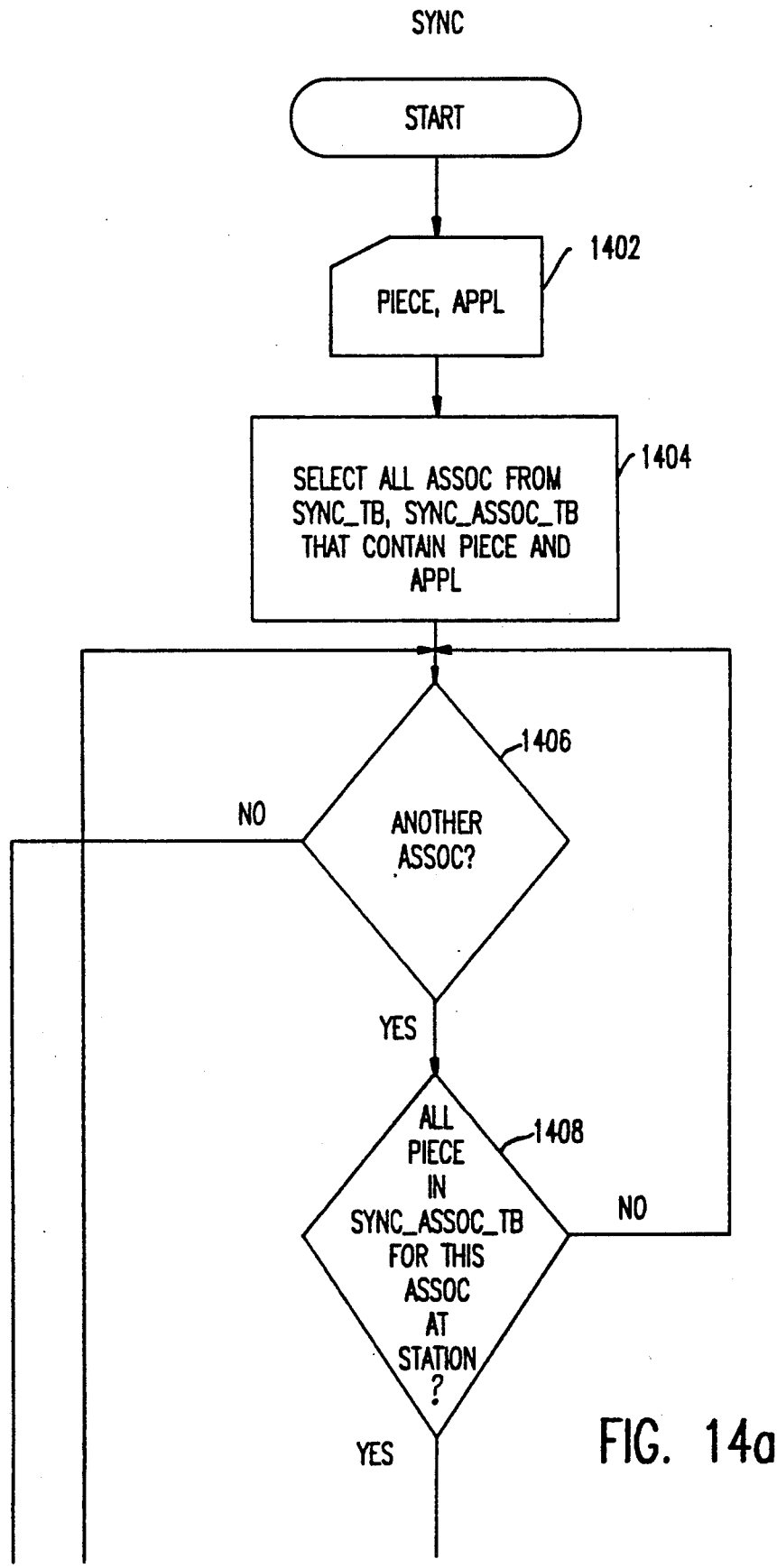
FIGS. 14a and 14b are a schematic representation of a routine employed in the operation of the invention in which pieces are synchronized at a particular station for assembly.
Figure 14B:
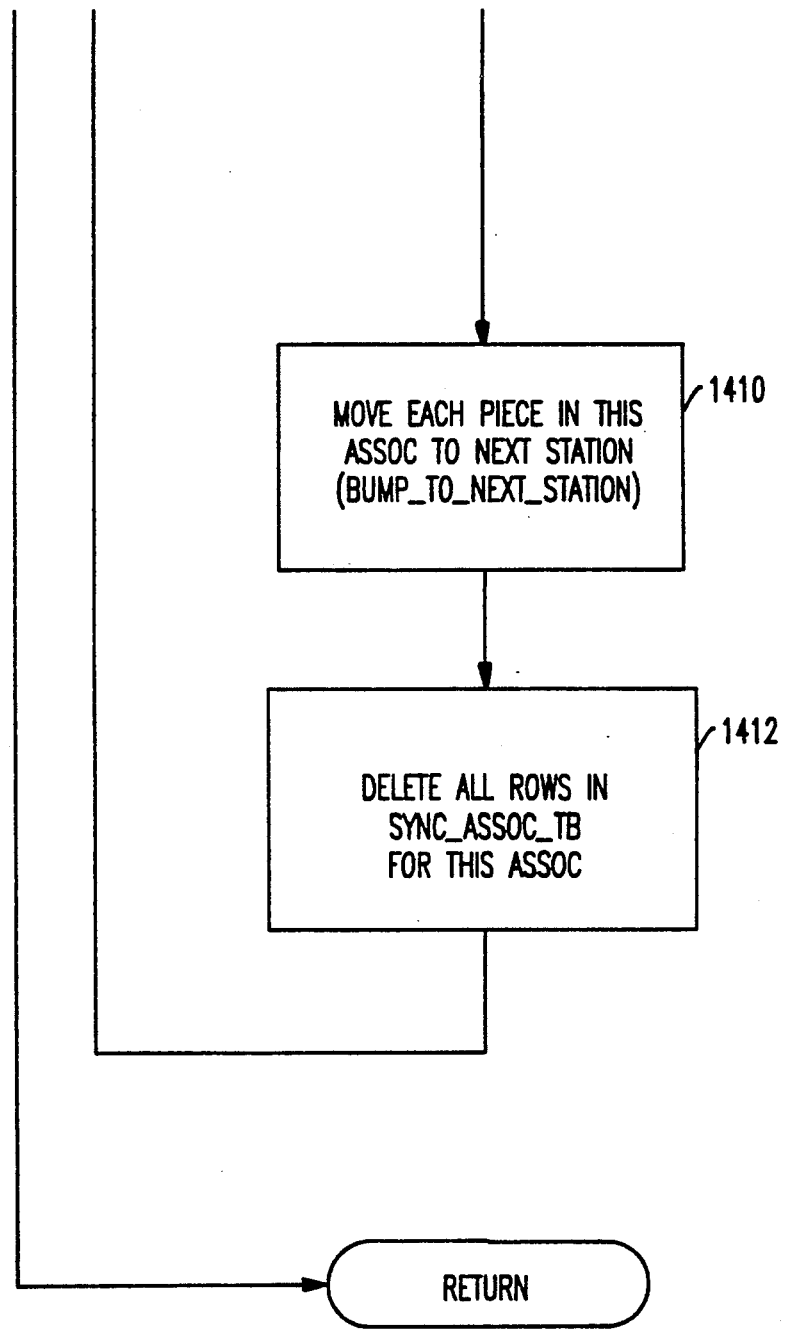

/* INPUT INCLUDES: APPL, ASSOC */
Delete from WORKWITH_ASSOC_TB row with APPL, ASSOC SYNC—This routine gathers pieces that are associated and passes them in one group to another station. It is an asynchronous, non-terminal task performed at an operatorless station, working with the variables PIECE and APPL. As shown schematically in FIGS. 14a and 14b and in pseudo code in Table 25, the routine first selects in step 1404 all distinct synchronization association identifiers ASSOC from the table SYNC_ASSOC_TB that contain the specified piece PIECE and APPL.

Figure 15:
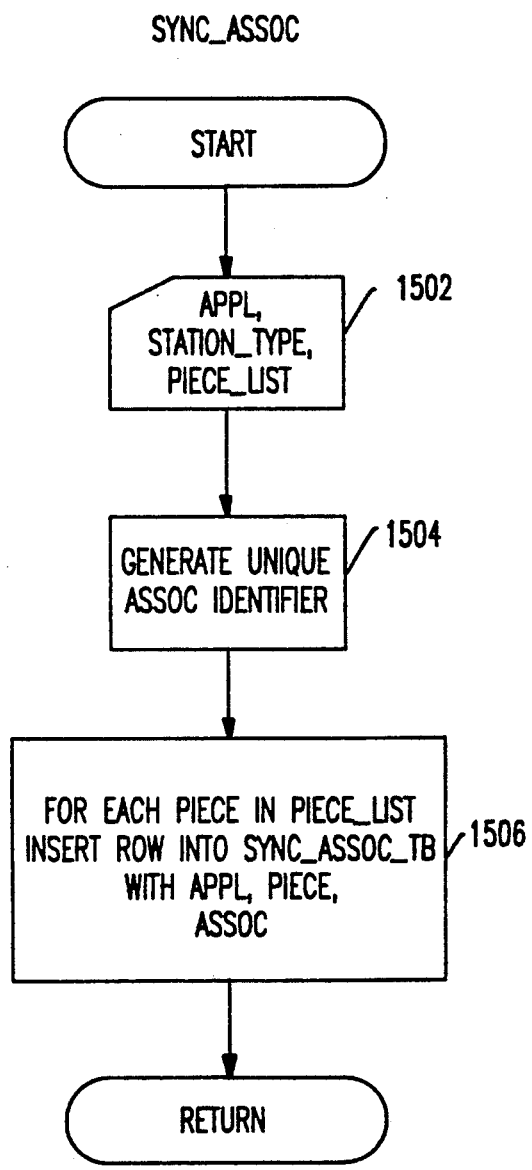
FIG. 15 is a schematic representation of a routine employed in the operation of the invention in which several pieces are associated with each other for purposes of synchronization at a specified station.

SYNC_ASSOC—This routine creates the appropriate rows in the SYNC_ASSOC_TB table for each of a number of associated pieces. It works with the variables APPL, STATION_TYPE, and (PIECE)LIST. As shown schematically in FIG. 15 and in pseudo code in Table 26, the routine first generates at step 1504 a unique identification number for the group of associated pieces (ASSOC).

TABLE 26

ROUTINE SYNC_ASSOC

```
/* INPUT INCLUDES: APPL, STATION_TYPE,
(PIECE)LIST */
/* OUTPUT INCLUDES: ASSOC
Generate unique ASSOC
Do while (another PIECE in (PIECE)LIST)
   Inset row into
   SYNC_ASSOC_TB with APPL, ASSOC,
   PIECE, STATION_TYPE
Enddo
```

Finally, for each piece in ASSOC, in step 1506 the routine inserts a row into the SYNC_ASSOC_TB table with the APPL, ASSOC, STATION_TYPE and PIECE data.

Figure 20:
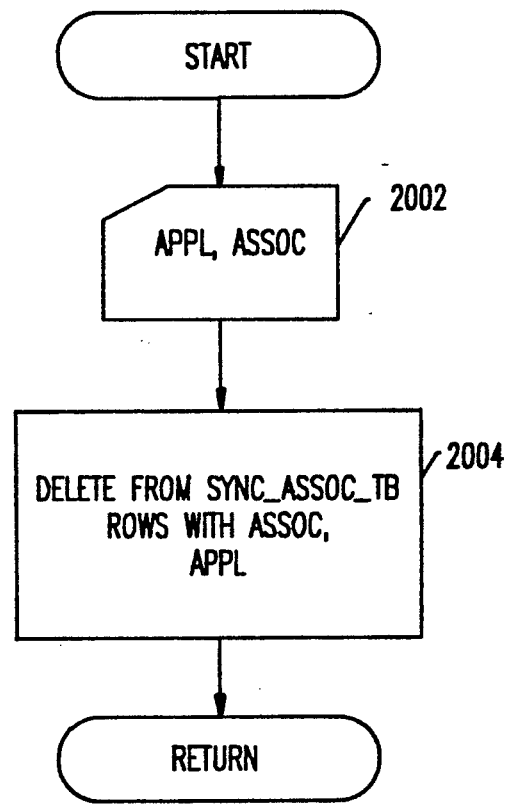
FIG. 20 is a schematic representation of a routine employed in the operation of the invention in which the association for synchronization among a group of pieces is eliminated.

DEL_SYNC_ASSOC—This routine performs the reverse of SYNC_ASSOC, deleting from SYNC_ASSOC_TB the rows corresponding to a specified ASSOC and its associated pieces. It works with the variables APPL, and ASSOC. As shown schematically in FIG. 20 and in pseudo code in Table 27, in step 2004 the routine deletes from SYNC_ASSOC_TB those rows having the specified ASSOC and APPL.

TABLE 27

ROUTINE DEL_SYNC_ASSOC

```
/* INPUT INCLUDES: APPL, ASSOC */
Delete from SYNC_ASSOC_TB row with APPL, ASSOC
```

Figure 16:
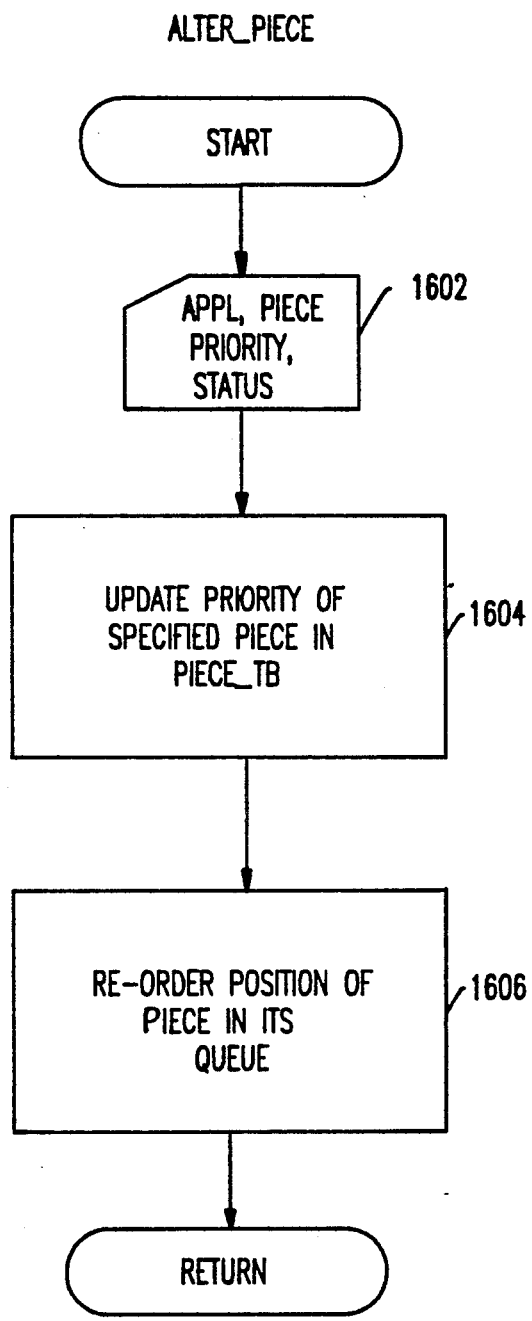
FIG. 16 is a schematic representation of a routine employed in the operation of the invention in which parameters pertaining to a piece can be altered.

ALTER_PIECE—This routine changes the priority of an existing piece to a specified priority and moves it to the appropriate position in its queue. It works with the variables APPL, PIECE, PRIORITY, and STATUS. As shown schematically in FIG. 16 and in pseudo code in Table 28, in step 1604 the routine updates the value in the PRIORITY variable for the designated PIECE in PIECE_TB to the value specified in the input.

TABLE 28

ROUTINE ALTER_PIECE

```
/* INPUT INCLUDES: APPL, PIECE, PRIORITY,
STATUS /*
ENQ piece table
Update PRIORITY of PIECE to new priority
Re-order position of PIECE in its queue
DEQ piece table
```

In step 1606, the position of PIECE is reordered in the queue to reflect its new priority. This operation is implemented by the relational database software, and may be an explicit step, involving a reindexing of the pertinent tables, or may be implicit in having changed the value of PRIORITY.

Figure 17:
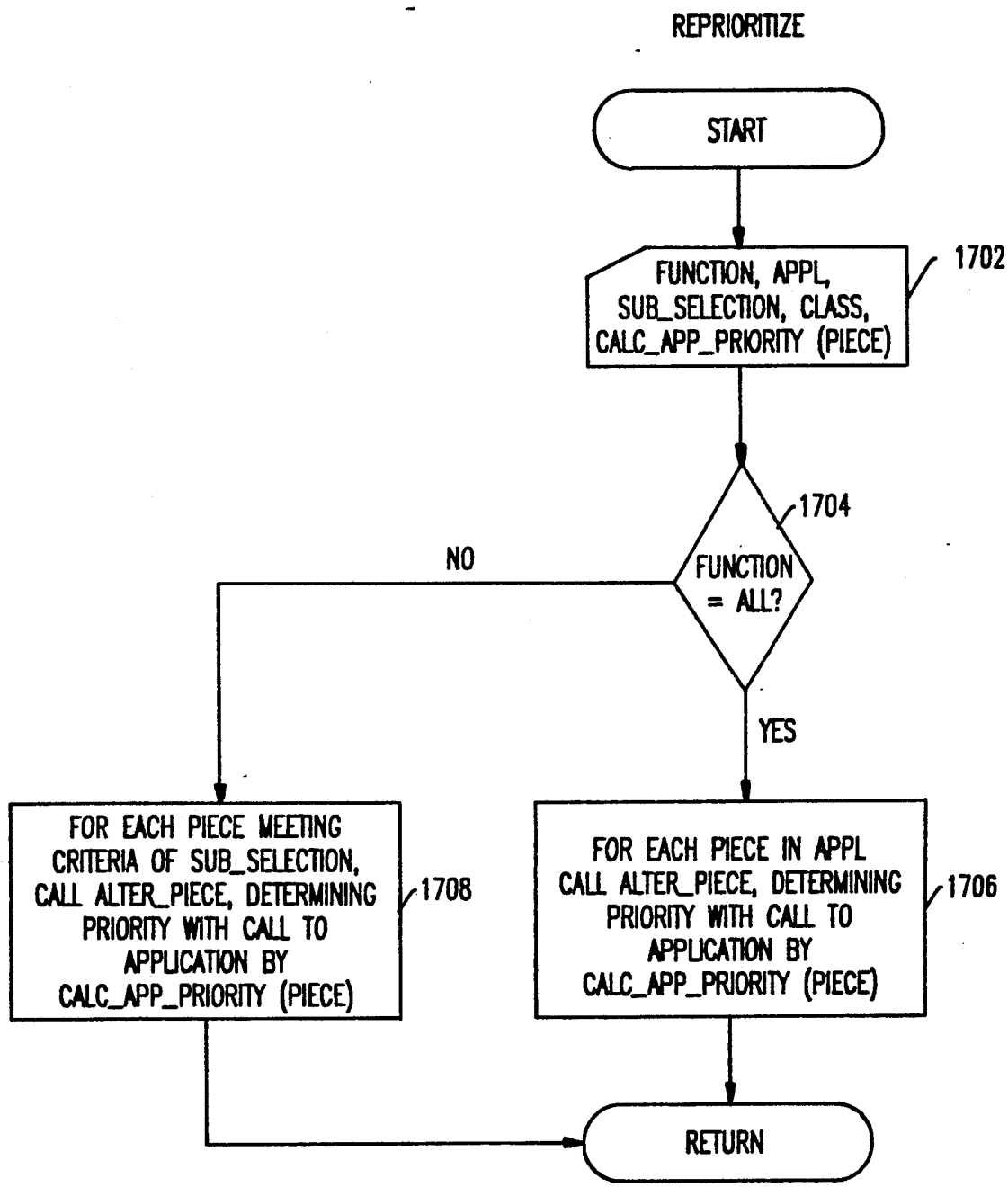
FIG. 17 is a schematic representation of a routine employed in the operation of the invention in which pieces in a system are reprioritized.

REPRIORITIZE—This routine reprioritizes all pieces for an application or a selected subset of pieces. It works with the variables FUNCTION, APPL, SUB_SELECTION, CLASS, and CALCULATE_APPL_PRIORITY(PIECE). SUB_SELECTION contains a specification of the subset, if any, of pieces in the application that are to be reprioritized. As shown schematically in FIG. 17 and in pseudo code in Table 29, in step 1704 the routine tests whether FUNCTION is equal to ALL, which indicates that application is directing that all pieces be reprioritized. In that case, the routine in step 1706 makes a call to the ALTER_PIECE routine for each piece in the application to the application's priority calculating utility to have the priority of that piece altered.

TABLE 29

ROUTINE REPRIORITIZE

```
/* INPUT INCLUDES: FUNCTION, APPL,
SUB_SELECTION, CLASS,
CALC_APP_PRIORITY /*
If FUNCTION = 'ALL' then for all pieces, PIECE
with (p.APPL = APPL)
   Call ALTER_PIECE (APPL, PIECE,
   CALCULATE_APPL_PRIORITY (PIECE))
Else for all pieces, PIECE in SUB_SELECTION
with (p.APPL = APPL),
   Call ALTER_PIECE (APPL, PIECE,
   CALCULATE_APPL_PRIORITY (PIECE))
```

If FUNCTION does not equal ALL, the routine assumes that a sub-set of the pieces in the application are to be reprioritized. It therefore in step 1708 makes a call to ALTER_PIECE for each piece in the application that meets the criteria of SUB_SELECTION.

Figure 18:
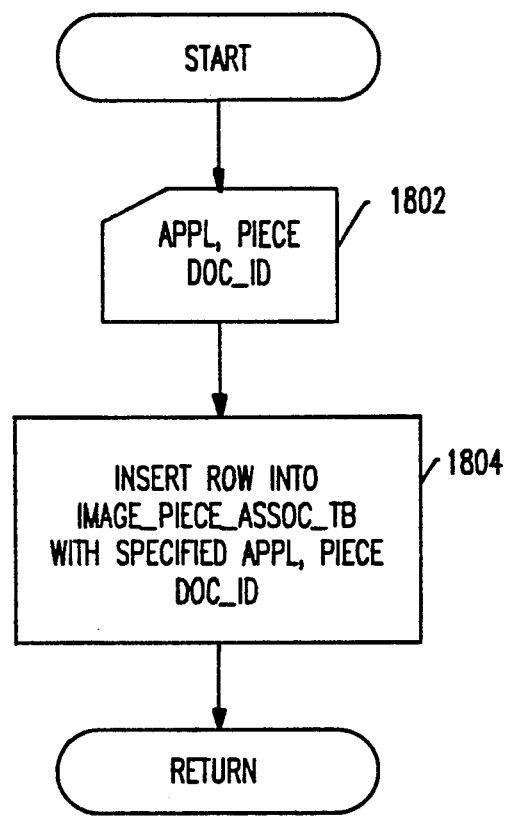
FIG. 18 is a schematic representation of a routine employed in the operation of the invention in which an image of a control document is associated with a piece.

ASSOC_IMAGE—This routine associates an image having a unique image identifier DOC_ID with a specified piece. It works with the variables APPL, PIECE, and DOC_ID. As shown schematically in FIG. 18 and in pseudo code in Table 30, in step 1804 the routine inserts into the IMAGE_PIECE_ASSOC_TB table a row containing the specified APPL, PIECE, and DOC_ID.

TABLE 30

ROUTINE ASSOC_IMAGE

```
/* INPUT INCLUDES: APPL, PIECE, DOC_ID /*
Inset row into
IMAGE_PIECE_ASSOC_TB
with DOC_ID, APPL, and PIECE.
```

Figure 19:
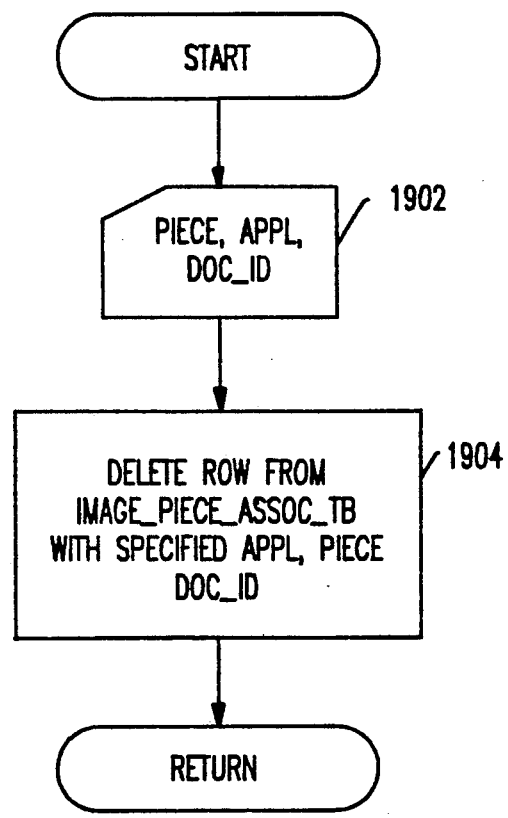
FIG. 19 is a schematic representation of a routine employed in the operation of the invention in which an image of a control document is disassociated from a piece.

DEASSOC_IMAGE—This routine is the converse of ASSOC_IMAGE. It disassociates an image from a specified piece. It works with the variables APPL, PIECE, and DOC_ID. As shown schematically in FIG. 19 and in pseudo code in Table 31, in step 1904 the routine deletes from the IMAGE_PIECE_ASSOC_TB table the row containing the specified APPL, PIECE, and DOC_ID.

TABLE 31

ROUTINE DEASSOC_IMAGE

```
/* INPUT INCLUDES: APPL, PIECE, DOC_ID /*
Delete row from IMAGE_PIECE_ASSOC_TB with
DOC_ID, APPL, and PIECE.
```

EXAMPLE—ADVERTISEMENT PRODUCTION

Figure 22:
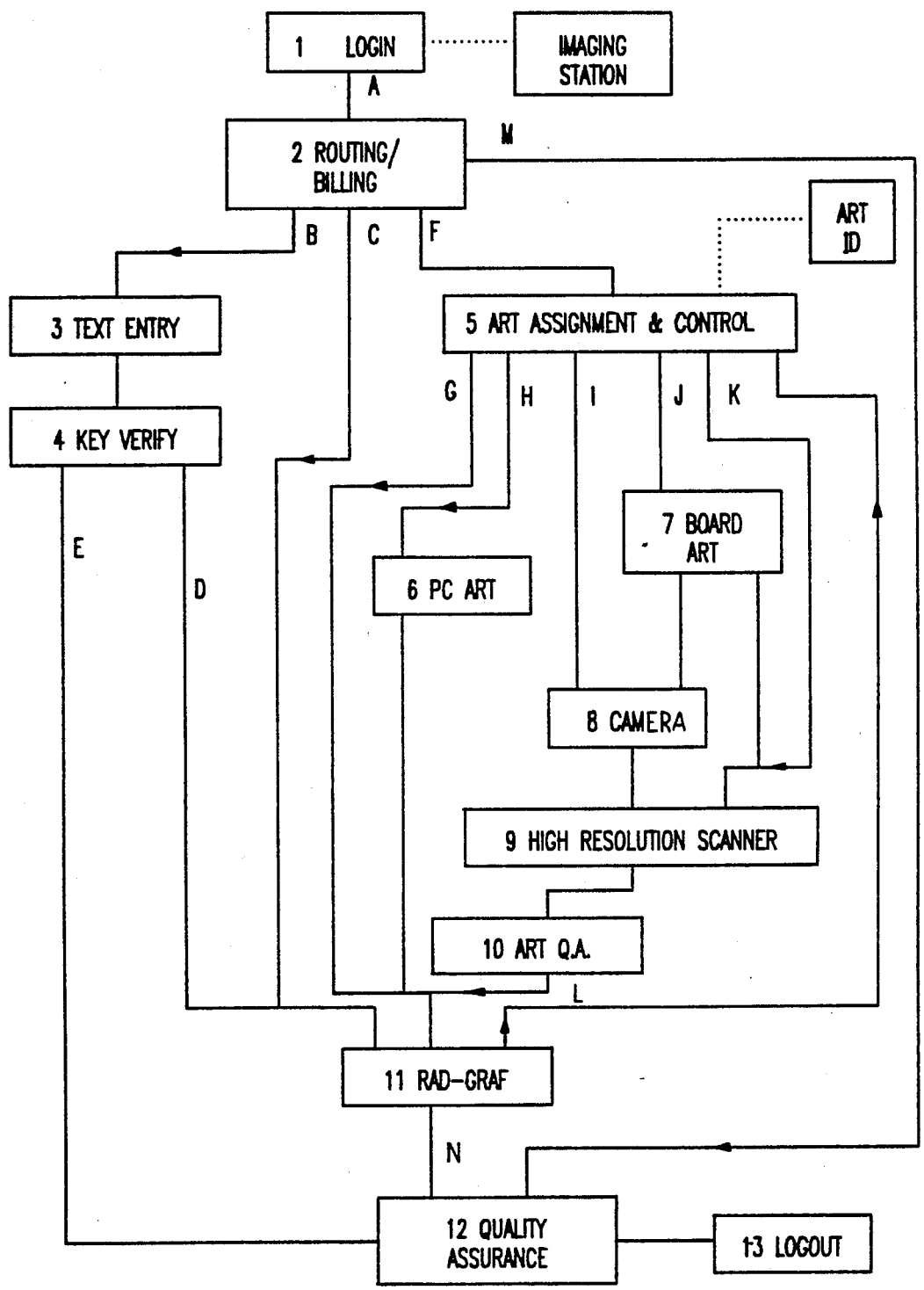
FIG. 22 is a schematic representation of a system for the production of trade advertisements used to illustrate the operation of the invention.

An example of an application with which RIS can be used is one in which the production system being controlled is one for the production of trade advertisements in which advertisements are composed and stored in digital form ready for use in classified directory production. In this context, a job is an advertisement, or ad. A piece of a job is text of the ad or one or more pieces of art work included in the ad. The job order is a copysheet that shows the layout of the ad and the text and artwork to be included. Most of the stations are microcomputers with operators that perform such tasks as text entry, art production, art scanning, proof printing, ad assembly, and quality assurance. The work flow of the system is shown in FIG. 22.

At a login station 1, the job control information for the ad is entered into the system and a unique identifier is assigned by the application. A job piece is created in RIS. Any associated art pieces, supplied or to be created, are assigned an art (piece) identifier by the application, the basic stem being the ad identifier for which they will be used.

The copysheet is then scanned and an image is created in the system tied to the system login control information. The next step is the Routing/Billing Station 2 (the task assignment station) where the image of the copysheet is displayed to the operator with the associated logged-in control data. The functions needed to be performed to produce the ad are then checked off on a task list. The required art and text pieces are then created with specified priorities and routes, and the job piece deleted, in RIS.

With the copysheet image, identifying control and routing data, entered into the system, the performance and timing of subsequent functions are controlled by the specified priorities and other information in the control tables representing requirements such as customer proof turnaround, sales canvass schedule periods, and directory closing schedules.

The route of an ad may follow two parallel paths if it includes both text and art pieces. Text is keyed into the system at the text entry station 3. From the text entry station the text piece is released to the key verify station 4, where the operator performs a quality assurance function. From station 4 the text piece can be released to a non-terminal synchronization station (not shown) where it awaits synchronization with the art pieces, or, if there are no art pieces, directly to a quality assurance station 12.

The art pieces are released from the routing/billing station 2 to the art assignment and control station 5. From that station, different types of art pieces follow different paths. Pieces that are worked on at the PC art station 6, are released directly from there to the synchronization station. Pieces worked on at board art station 7 may be released to the camera station 8 for photographing and thence to high resolution scanner station 9 for digitizing and entry into the application in electronic form, or may be released directly to the scanner station. Art may also be released directly to the camera station if camera ready, or directly to the scanner station. Art that is already in inventory may be released directly from the art assignment station to the synchronization station.

Any piece that reaches the scanner station is released to the art quality assurance station 10. From there it can be released back to the art assignment station if the operator rejects the piece and requires it to be reworked. If the operator approves the piece, it is released to the synchronization station.

Once the text piece and all art pieces are released to the synchronization station the SYNC function determines that the synchronization associated pieces are available and acquires and releases them to the next station - the RAD-GRAF station 11. This station is used to layout the text and the art pieces of an ad in accordance with the copysheet. An ad piece is created for the combination of the text and art pieces, the image of the copysheet displayed, and the combined text and art pieces presented to the operator in a preliminary layout of the ad. The operator can perform further manipulation. The constituent pieces are deleted, a proof of the ad printed, and the ad piece released to the quality assurance station 12.

The operator of the quality assurance station checks the proof against the copysheet image to determine if the ad conforms to the copysheet and all quality standards. After the check, the ad is logged out of the system as complete and stored for use during directory production. The ad piece is deleted.

```
--- INTO BBRXA.ROUTE_VW
     (OPCO, APPL, ROUTE_TYPE,
      CURR_STATION_TYPE, NEXT_STATION_TYPE, PARM1)
--- VALUES
     ('TM', 'AMPS', 'ART',
      'RAD', 'RAD-GRAF', '');

INSERT
  INTO BBRXA.ROUTE_VW
     (OPCO, APPL, ROUTE_TYPE,
      CURR_STATION_TYPE, NEXT_STATION_TYPE, PARM1)
  VALUES
     ('TM', 'AMPS', 'ART',
      'RAD-GRAF', '*END', '');

INSERT
  INTO BBRXA.ROUTE_VW
     (OPCO, APPL, ROUTE_TYPE,
      CURR_STATION_TYPE, NEXT_STATION_TYPE, PARM1)
```

```
        VALUES
            ('TM', 'AMPS', 'AD TO PG',
             '*START', 'RAD', '');

INSERT
        INTO BBRXA.ROUTE_VW
            (OPCO, APPL, ROUTE_TYPE,
             CURR_STATION_TYPE, NEXT_STATION_TYPE, PARM1)
        VALUES
            ('TM', 'AMPS', 'AD TO PG',
             'RAD', 'RAD-GRAF', '');

INSERT
        INTO BBRXA.ROUTE_VW
            (OPCO, APPL, ROUTE_TYPE,
             CURR_STATION_TYPE, NEXT_STATION_TYPE, PARM1)
        VALUES
            ('TM', 'AMPS', 'AD TO PG',
             'RAD-GRAF', 'QC', '');

INSERT
        INTO BBRXA.ROUTE_VW
            (OPCO, APPL, ROUTE_TYPE,
             CURR_STATION_TYPE, NEXT_STATION_TYPE, PARM1)
        VALUES
            ('TM', 'AMPS', 'AD TO PG',
             'QC', 'LOGOUT', '');

INSERT
        INTO BBRXA.ROUTE_VW
            (OPCO, APPL, ROUTE_TYPE,
             CURR_STATION_TYPE, NEXT_STATION_TYPE, PARM1)
        VALUES
            ('TM', 'AMPS', 'AD TO PG',
             'LOGOUT', '*END', '');

INSERT
        INTO BBRXA.ROUTE_VW
            (OPCO, APPL, ROUTE_TYPE,
             CURR_STATION_TYPE, NEXT_STATION_TYPE, PARM1)
        VALUES
            ('TM', 'AMPS', 'AD TO PG',
             '*START', 'RAD', '');

INSERT
        INTO BBRXA.ROUTE_VW
            (OPCO, APPL, ROUTE_TYPE,
             CURR_STATION_TYPE, NEXT_STATION_TYPE, PARM1)
        VALUES
            ('TM', 'AMPS', 'AD TO PG',
             'RAD', 'RAD-GRAF', '');

INSERT
        INTO BBRXA.ROUTE_VW
            (OPCO, APPL, ROUTE_TYPE,
             CURR_STATION_TYPE, NEXT_STATION_TYPE, PARM1)
```

```
    VALUES
        ('TM', 'AMPS', '- AD TO PG',
        'RAD-GRAF', 'QC', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', '- AD TO PG',
     'QC', 'CAMERA', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', '- AD TO PG',
     'CAMERA', 'LOGOUT', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', '- AD TO PG',
     'LOGOUT', '*END', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'DN',

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'DN',
     'VOLT-DN', 'SENT', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'DN',
     'SENT', 'RECEIVED', '');

INSERT
  INTO BBRXA.ROUTE_VW
    (OPCO, APPL, ROUTE_TYPE,
     CURR_STATION_TYPE, NEXT_STATION_TYPE, PARM1)
```

```
--  VALUES
--      ('TM', 'AMPS', 'DN',
--       'RECEIVED', '*END', '');

-- INSERT
--   INTO BBRXA.ROUTE_VW
--      (OPCO, APPL, ROUTE_TYPE,
--       CURR_STATION_TYPE, NEXT_STATION_TYPE, PARM1)
--   VALUES
--      ('TM', 'AMPS', 'COPY SHEET',
--       '*START', 'SENT', '');

-- INSERT
--   INTO BBRXA.ROUTE_VW
--      (OPCO, APPL, ROUTE_TYPE,
--       CURR_STATION_TYPE, NEXT_STATION_TYPE, PARM1)
--   VALUES
--      ('TM', 'AMPS', 'COPY SHEET',
--       'SENT', 'RECEIVED', '');

-- INSERT
--   INTO BBRXA.ROUTE_VW
--      (OPCO, APPL, ROUTE_TYPE,
--       CURR_STATION_TYPE, NEXT_STATION_TYPE, PARM1)
--   VALUES
--      ('TM', 'AMPS', 'COPY SHEET',
--       'RECEIVED', '*END', '');

-------------------------------------------------

GRANT DBADM
   ON DATABASE BBRXA
   TO YYYYYY;

GRANT DELETE, INSERT, SELECT, UPDATE
   ON TABLE BBRXA.ROUTE_TYPE_VW,
            BBRXA.ROUTE_VW,
            BBRXA.PIECE_TYPE_VW,
            BBRXA.PIECE_VW,
            BBRXA.STATION_TYPE_VW
   TO PUBLIC;

-------------------------------------------------

DROP   SYNONYM STATION_TYPE_VW   ;
DROP   SYNONYM ROUTE_TYPE_VW     ;
DROP   SYNONYM ROUTE_VW          ;
DROP   SYNONYM PIECE_TYPE_VW     ;
DROP   SYNONYM PIECE_VW          ;
DROP   SYNONYM APPL_TYPE_VW      ;
DROP   SYNONYM OPCO_TYPE_VW      ;
DROP   SYNONYM IMAGE_SCANNED_VW  ;
DROP   SYNONYM IMAG_PIECE_VW     ;
DROP   SYNONYM WW_ASSOC_VW       ;
DROP   SYNONYM SYNC_ASSOC_VW     ;
DROP   SYNONYM SYNC_VW           ;
```

```
CREATE SYNONYM STATION_TYPE_VW     FOR BBRXA.STATION_TYPE_VW;
CREATE SYNONYM ROUTE_TYPE_VW       FOR BBRXA.ROUTE_TYPE_VW;
CREATE SYNONYM ROUTE_VW            FOR BBRXA.ROUTE_VW;
CREATE SYNONYM PIECE_TYPE_VW       FOR BBRXA.PIECE_TYPE_VW;
CREATE SYNONYM PIECE_VW            FOR BBRXA.PIECE_VW;
CREATE SYNONYM APPL_TYPE_VW        FOR BBRXA.APPL_TYPE_TB;
CREATE SYNONYM OPCO_TYPE_VW        FOR BBRXA.OPCO_TYPE_TB;
CREATE SYNONYM IMAGE_SCANNED_VW    FOR BBRXA.IMAGE_SCANNED_TB;
CREATE SYNONYM IMAG_PIECE_VW       FOR BBRXA.IMAG_PIECE_TB;
CREATE SYNONYM WW_ASSOC_VW         FOR BBRXA.ASSOC_TB;
CREATE SYNONYM SYNC_ASSOC_VW       FOR BBRXA.SYNC_ASSOC_TB;
CREATE SYNONYM SYNC_VW             FOR BBRXA.SYNC_TB;
```

MICROFICHE APPENDIX

----- Routeer-Imaging-Scheduler Table definitions -----

```
CREATE STOGROUP   BBRXA01
   VOLUMES (BBM001,BBM002,BBM003)
   VCAT    AROUT;

CREATE DATABASE   BBRXA
       STOGROUP   BBRXA01
       BUFFERPOOL BP0;

CREATE TABLESPACE BBRXA01
   IN BBRXA
   USING STOGROUP  BBRXA01
       PRIQTY     4000
       SECQTY     2000
       ERASE      NO
    FREEPAGE     5
    PCTFREE      5
    BUFFERPOOL   BP0
    LOCKSIZE     ANY
    CLOSE        NO
    SEGSIZE      32;

----- route / station definitions

CREATE TABLE    BBRXA.STATION_TYPE_TB
    (APPL               CHAR ( 10)   NOT NULL,
     STATION_TYPE       CHAR ( 10)   NOT NULL,
     CICS_PROG          CHAR (  8)   NOT NULL,
     CICS_TRANSID       CHAR (  4)   NOT NULL,
     TRIGGER            CHAR (  1)   NOT NULL WITH DEFAULT,
     PARM1              VARCHAR (100) NOT NULL WITH DEFAULT,
```

```
    STATION_TEXT         VARCHAR (100)  NOT NULL WITH DEFAULT,

PRIMARY KEY (APPL, STATION_TYPE))

IN BBRXA.BBRXA01;

CREATE TABLE    BBRXA.ROUTE_TYPE_TB
   (APPL                 CHAR ( 10)  NOT NULL,
    OPCO                 CHAR (  2)  NOT NULL,
    ROUTE_TYPE           CHAR ( 10)  NOT NULL,

PRIMARY KEY (APPL, OPCO, ROUTE_TYPE))

IN BBRXA.BBRXA01;

CREATE TABLE    BBRXA.ROUTE_TB
   (APPL                 CHAR ( 10)  NOT NULL,
    OPCO                 CHAR (  2)  NOT NULL,
    ROUTE_TYPE           CHAR ( 10)  NOT NULL,
    CURR_STATION_TYPE    CHAR ( 10)  NOT NULL,
    NEXT_STATION_TYPE    CHAR ( 10)  NOT NULL,
    DEFAULT              CHAR (  1)  NOT NULL WITH DEFAULT,
    PARM1                CHAR (  1)  NOT NULL,

PRIMARY KEY (APPL, OPCO,
              ROUTE_TYPE, CURR_STATION_TYPE,
              NEXT_STATION_TYPE))

IN BBRXA.BBRXA01;

--------working piece data

CREATE TABLE    BBRXA.PIECE_TYPE_TB
   (APPL                 CHAR ( 10)  NOT NULL,
    PIECE_TYPE           CHAR ( 10)  NOT NULL,

PRIMARY KEY (APPL, PIECE_TYPE))

IN BBRXA.BBRXA01;

CREATE TABLE    BBRXA.PIECE_TB
   (APPL                 CHAR ( 10)  NOT NULL,
    PIECE                CHAR ( 15)  NOT NULL,
    PIECE_TYPE           CHAR ( 10)  NOT NULL,
    OPCO                 CHAR (  2)  NOT NULL,
    ROUTE_TYPE           CHAR ( 10)  NOT NULL,
    QUEUE_STATION_TYPE   CHAR ( 10)  NOT NULL,
    STATUS               CHAR (  1)  NOT NULL WITH DEFAULT,
    PRIORITY             CHAR ( 20)  NOT NULL WITH DEFAULT,
    CREATION_TIMESTAMP   TIMESTAMP   NOT NULL WITH DEFAULT,
    UPDATE_TIMESTAMP     TIMESTAMP   NOT NULL WITH DEFAULT,

PRIMARY KEY (APPL, PIECE))

IN BBRXA.BBRXA01;
```

```
------ site / customer controls

CREATE TABLE    BBRXA.APPL_TYPE_TB
    (APPL                   CHAR ( 10)  NOT NULL,
     APPL_NAME              VARCHAR (100) NOT NULL,

PRIMARY KEY (APPL))

IN BBRXA.BBRXA01;

CREATE TABLE    BBRXA.OPCO_TYPE_TB
    (OPCO                   CHAR (  2)  NOT NULL,
     OPCO_NAME              VARCHAR (100) NOT NULL,

PRIMARY KEY (OPCO))

IN BBRXA.BBRXA01;

------ imaging tables

CREATE TABLE    BBRXA.IMAGE_SCANNED_TB
    (DOC_ID                 CHAR ( 44)  NOT NULL,
     TRANSID                CHAR (  8)  NOT NULL,

PRIMARY KEY (DOC_ID))

IN BBRXA.BBRXA01;

CREATE TABLE    BBRXA.IMAG_PIECE_TB
    (APPL                   CHAR ( 10)  NOT NULL,
     PIECE                  CHAR ( 15)  NOT NULL,
     DOC_ID                 CHAR ( 44)  NOT NULL,

PRIMARY KEY (APPL,PIECE,DOC_ID))

IN BBRXA.BBRXA01;

------ router association tables

CREATE TABLE    BBRXA.WW_ASSOC_TB
    (APPL                   CHAR ( 10)  NOT NULL,
     PIECE                  CHAR ( 15)  NOT NULL,
     ASSOC_ID               CHAR ( 20)  NOT NULL,

PRIMARY KEY (APPL,PIECE,ASSOC_ID))

IN BBRXA.BBRXA01;

CREATE TABLE    BBRXA.SYNC_ASSOC_TB
    (APPL                   CHAR ( 10)  NOT NULL,
     PIECE                  CHAR ( 15)  NOT NULL,
     ASSOC_ID               CHAR ( 20)  NOT NULL,

PRIMARY KEY (APPL,PIECE,ASSOC_ID))
```

```
   IN BBRXA.BBRXA01;

CREATE TABLE    BBRXA.SYNC_TB
   (APPL              CHAR ( 10)  NOT NULL,
    ASSOC_ID          CHAR ( 20)  NOT NULL,
    STATION_TYPE      CHAR ( 10)  NOT NULL,

PRIMARY KEY (APPL,ASSOC_ID,STATION_TYPE))

IN BBRXA.BBRXA01;

---------------------------------------------------------

- PRIME INDEX
CREATE  UNIQUE  INDEX   BBRXA.STATION_TYPE_IX
   ON  BBRXA.STATION_TYPE_TB
      (APPL                ASC,
       STATION_TYPE        ASC)
   USING STOGROUP  BBRXA01
      PRIQTY        12
      SECQTY        12
      ERASE         NO
      FREEPAGE      0
      PCTFREE       10
      CLUSTER
      SUBPAGES      4
      BUFFERPOOL    BP0
      CLOSE         NO;

- PRIME INDEX
CREATE  UNIQUE  INDEX   BBRXA.ROUTE_TYPE_IX
   ON  BBRXA.ROUTE_TYPE_TB
      (APPL                ASC,
       OPCO                ASC,
       ROUTE_TYPE          ASC)
   USING STOGROUP  BBRXA01
      PRIQTY        12
      SECQTY        12
      ERASE         NO
      FREEPAGE      0
      PCTFREE       10
      CLUSTER
      SUBPAGES      4
      BUFFERPOOL    BP0
      CLOSE         NO;

- PRIME INDEX
CREATE  UNIQUE  INDEX   BBRXA.ROUTE_IX
   ON  BBRXA.ROUTE_TB
      (APPL                ASC,
       OPCO                ASC,
       ROUTE_TYPE          ASC,
       CURR_STATION_TYPE   ASC,
       NEXT_STATION_TYPE   ASC)
```

```
     USING STOGROUP    BBRXA01
        PRIQTY         12
        SECQTY         40
        ERASE          NO
     FREEPAGE          0
     PCTFREE           10
     CLUSTER
     SUBPAGES          4
     BUFFERPOOL        BP0
     CLOSE             NO;

RI ON STATION_TYPE_TB
CREATE             INDEX    BBRXA.ROUTE_IX01

(APPL                  ASC,
      CURR_STATION_TYPE     ASC)
     USING STOGROUP    BBRXA01
        PRIQTY         12
        SECQTY         40
        ERASE          NO
     FREEPAGE          0
     PCTFREE           10
     SUBPAGES          4
     BUFFERPOOL        BP0
     CLOSE             NO;

RI ON STATION_TYPE_TB
CREATE             INDEX    BBRXA.ROUTE_IX02
  ON  BBRXA.ROUTE_TB
     (APPL                  ASC,
      NEXT_STATION_TYPE     ASC)
     USING STOGROUP    BBRXA01
        PRIQTY         12
        SECQTY         40
        ERASE          NO
     FREEPAGE          0
     PCTFREE           10
     SUBPAGES          4
     BUFFERPOOL        BP0
     CLOSE             NO;

PRIME INDEX
CREATE  UNIQUE  INDEX    BBRXA.PIECE_TYPE_IX
  ON  BBRXA.PIECE_TYPE_TB
     (APPL                  ASC,
      PIECE_TYPE            ASC)
     USING STOGROUP    BBRXA01
        PRIQTY         12
        SECQTY         12
        ERASE          NO
     FREEPAGE          0
     PCTFREE           10
     CLUSTER
     SUBPAGES          4
     BUFFERPOOL        BP0
     CLOSE             NO;
```

* PRIME INDEX
```
CREATE    UNIQUE    INDEX    BBRXA.PIECE_IX
   ON    BBRXA.PIECE_TB
     (APPL            ASC,
      PIECE           ASC)
   USING STOGROUP    BBRXA01
       PRIQTY        1000
       SECQTY        0400
       ERASE         NO
     FREEPAGE        0
     PCTFREE         10
     SUBPAGES        4
     BUFFERPOOL      BP0
     CLOSE           NO;
```

RI ON PIECE_TYPE
```
CREATE              INDEX    BBRXA.PIECE_IX01
   ON   BBRXA.PIECE_TB
     (APPL,
      PIECE_TYPE)
   USING STOGROUP    BBRXA01
       PRIQTY        200
       SECQTY        050
       ERASE         NO
     FREEPAGE        0
     PCTFREE         10
     SUBPAGES        4
     BUFFERPOOL      BP0
     CLOSE           NO;
```

* RI ON STATION_TYPE
```
CREATE              INDEX    BBRXA.PIECE_IX02
   ON   BBRXA.PIECE_TB
     (APPL,
      QUEUE_STATION_TYPE)
   USING STOGROUP    BBRXA01
       PRIQTY        200
       SECQTY        050
       ERASE         NO
     FREEPAGE        0
     PCTFREE         10
     SUBPAGES        4
     BUFFERPOOL      BP0
     CLOSE           NO;
```

* RI ON ROUTE_TYPE
```
CREATE              INDEX    BBRXA.PIECE_IX03
   ON   BBRXA.PIECE_TB
     (APPL,
      OPCO,
      ROUTE_TYPE)
   USING STOGROUP    BBRXA01
       PRIQTY        200
       SECQTY        050
       ERASE         NO
```

```
        FREEPAGE         0
        PCTFREE         10
        SUBPAGES         4
        BUFFERPOOL      BP0
        CLOSE           NO;

-- PRIME INDEX
CREATE  UNIQUE  INDEX   BBRXA.APPL_TYPE_IX
    ON  BBRXA.APPL_TYPE_TB
        (APPL                    ASC,

USING STOGROUP   BBRXA01
        PRIQTY          12
        SECQTY          12
        ERASE           NO
        FREEPAGE         0
        PCTFREE         10
        CLUSTER
        SUBPAGES         4
        BUFFERPOOL      BP0
        CLOSE           NO;

- PRIME INDEX
CREATE  UNIQUE  INDEX   BBRXA.OPCO_TYPE_IX
    ON  BBRXA.OPCO_TYPE_TB
        (OPCO                    ASC,
         OPCO_NAME               ASC)
    USING STOGROUP   BBRXA01
        PRIQTY          12
        SECQTY          12
        ERASE           NO
        FREEPAGE         0
        PCTFREE         10
        CLUSTER
        SUBPAGES         4
        BUFFERPOOL      BP0
        CLOSE           NO;

- PRIME INDEX
CREATE  UNIQUE  INDEX   BBRXA.IMAGE_SCANNED_IX
    ON  BBRXA.IMAGE_SCANNED_TB
        (DOC_ID                  ASC)
    USING STOGROUP   BBRXA01
        PRIQTY          12
        SECQTY          12
        ERASE           NO
        FREEPAGE         0
        PCTFREE         10
        CLUSTER
        SUBPAGES         4
        BUFFERPOOL      BP0
        CLOSE           NO;

- PRIME INDEX
CREATE  UNIQUE  INDEX   BBRXA.IMAG_PIECE_IX
    ON  BBRXA.IMAG_PIECE_TB
```

```
        (APPL                  ASC,
         PIECE                 ASC,
         DOC_ID                ASC)
    USING STOGROUP    BBRXA01
       PRIQTY        12
       SECQTY        12
       ERASE         NO
    FREEPAGE         0
    PCTFREE          10
    SUBPAGES         4
    BUFFERPOOL       BP0
    CLOSE            NO;

- PRIME INDEX
CREATE   UNIQUE   INDEX    BBRXA.WW_ASSOC_IX
   ON  BBRXA.WW_ASSOC_TB
       (APPL                  ASC,
        PIECE                 ASC,
        ASSOC_ID              ASC)
    USING STOGROUP    BBRXA01
       PRIQTY        12
       SECQTY        12
       ERASE         NO
    FREEPAGE         0
    PCTFREE          10
    CLUSTER
    SUBPAGES         4
    BUFFERPOOL       BP0
    CLOSE            NO;

- PRIME INDEX
CREATE   UNIQUE   INDEX    BBRXA.SYNC_ASSOC_IX
   ON  BBRXA.SYNC_ASSOC_TB
       (APPL                  ASC,
        PIECE                 ASC,
        ASSOC_ID              ASC)
    USING STOGROUP    BBRXA01
       PRIQTY        12
       SECQTY        12
       ERASE         NO
    FREEPAGE         0
    PCTFREE          10
    CLUSTER
    SUBPAGES         4
    BUFFERPOOL       BP0
    CLOSE            NO;

- PRIME INDEX
CREATE   UNIQUE   INDEX    BBRXA.SYNC_IX
   ON  BBRXA.SYNC_TB
       (APPL                  ASC,
        ASSOC_ID              ASC,
        STATION_TYPE          ASC)
    USING STOGROUP    BBRXA01
       PRIQTY        12
       SECQTY        12
```

```
        ERASE         NO
     FREEPAGE         0
     PCTFREE          10
     CLUSTER
     SUBPAGES         4
     BUFFERPOOL       BP0
     CLOSE            NO;
```

---

```
ALTER TABLE BBRXA.ROUTE_TYPE_TB
      FOREIGN KEY OPCOTYPE
          (OPCO)
      REFERENCES BBRXA.OPCO_TYPE_TB
      ON DELETE  RESTRICT;

ALTER TABLE BBRXA.ROUTE_TYPE_TB
      FOREIGN KEY APPLTYPE
          (APPL)
      REFERENCES BBRXA.APPL_TYPE_TB
      ON DELETE  RESTRICT;

ALTER TABLE BBRXA.ROUTE_TB
      FOREIGN KEY CROUTYPE
          (APPL, OPCO, ROUTE_TYPE)
      REFERENCES BBRXA.ROUTE_TYPE_TB
      ON DELETE  RESTRICT;

ALTER TABLE BBRXA.ROUTE_TB
      FOREIGN KEY STATTYPC
          (APPL, CURR_STATION_TYPE)
      REFERENCES BBRXA.STATION_TYPE_TB
      ON DELETE  RESTRICT;

ALTER TABLE BBRXA.ROUTE_TB
      FOREIGN KEY STATTYPN
          (APPL, NEXT_STATION_TYPE)
      REFERENCES BBRXA.STATION_TYPE_TB
      ON DELETE  RESTRICT;

ALTER TABLE BBRXA.PIECE_TYPE_TB
      FOREIGN KEY APPLTYPE
          (APPL)
      REFERENCES BBRXA.APPL_TYPE_TB
      ON DELETE  RESTRICT;

ALTER TABLE BBRXA.PIECE_TB
      FOREIGN KEY PCETYPE
          (APPL, PIECE_TYPE)
      REFERENCES BBRXA.PIECE_TYPE_TB
      ON DELETE  RESTRICT;

ALTER TABLE BBRXA.PIECE_TB
      FOREIGN KEY STATTYPE
```

```
        (APPL, QUEUE_STATION_TYPE)
        REFERENCES BBRXA.STATION_TYPE_TB
     ON DELETE RESTRICT;

ALTER TABLE BBRXA.PIECE_TB
        FOREIGN KEY ROUTTYPE
            (APPL, OPCO, ROUTE_TYPE)
        REFERENCES BBRXA.ROUTE_TYPE_TB
        ON DELETE RESTRICT;
```

* CAN NOT PUT RI ON ROUTE_TYPE || QUEUE_STATION_TYPE IN PIECE_TB
BECAUSE THE PRIME KEY IN ROUTE_TYPE_TB OR ROUTE_TB DOES NOT MATCH
SO, THE INTERGRITY CONSTRAINT IS INSURED BY R-I-S VALIDATION CODE

```
ALTER TABLE BBRXA.STATION_TYPE_TB
        FOREIGN KEY APPLTYPE
            (APPL)
        REFERENCES BBRXA.APPL_TYPE_TB
        ON DELETE RESTRICT;
```

---

```
CREATE VIEW BBRXA.ROUTE_TYPE_VW AS
    SELECT APPL, OPCO, ROUTE_TYPE
    FROM BBRXA.ROUTE_TYPE_TB;

CREATE VIEW BBRXA.ROUTE_VW AS
    SELECT APPL, OPCO, ROUTE_TYPE, CURR_STATION_TYPE,
           NEXT_STATION_TYPE, DEFAULT
    FROM BBRXA.ROUTE_TB;

CREATE VIEW BBRXA.PIECE_TYPE_VW AS
    SELECT APPL, PIECE_TYPE
    FROM BBRXA.PIECE_TYPE_TB;

CREATE VIEW BBRXA.PIECE_VW AS
    SELECT APPL, PIECE, PIECE_TYPE, OPCO, ROUTE_TYPE,
           QUEUE_STATION_TYPE, STATUS, PRIORITY, CREATION_TIMESTAMP,
           UPDATE_TIMESTAMP
    FROM BBRXA.PIECE_TB;

CREATE VIEW BBRXA.STATION_TYPE_VW AS
    SELECT APPL, STATION_TYPE, CICS_PROG, CICS_TRANSID,
           TRIGGER, PARM1, STATION_TEXT
    FROM BBRXA.STATION_TYPE_TB;
```

------ sample data ------

```
INSERT
    INTO BBRXA.PIECE_TYPE_VW
        (APPL, PIECE_TYPE)
    VALUES
        ('AMPS', 'TEXT');
```

```
INSERT
   INTO BBRXA.PIECE_TYPE_VW
      (APPL, PIECE_TYPE)
   VALUES
      ('AMPS', 'ART');

INSERT
   INTO BBRXA.PIECE_TYPE_VW
      (APPL, PIECE_TYPE)
   VALUES
      ('AMPS', 'COPY SHEET');

INSERT
   INTO BBRXA.PIECE_TYPE_VW
      (APPL, PIECE_TYPE)
   VALUES
      ('AMPS', 'AD');

INSERT
   INTO BBRXA.STATION_TYPE_VW
      (APPL, STATION_TYPE, CICS_PROG, CICS_TRANSID,
       TRIGGER, PARM1, STATION_TEXT)
   VALUES
      ('AMPS', '*START', '', '',
       '', '', 'The start of this route');

INSERT
   INTO BBRXA.STATION_TYPE_VW
      (APPL, STATION_TYPE, CICS_PROG, CICS_TRANSID,
       TRIGGER, PARM1, STATION_TEXT)
   VALUES
      ('AMPS', '*END', '', '',
       '', '', 'The end of this route');

INSERT
   INTO BBRXA.STATION_TYPE_VW
      (APPL, STATION_TYPE, CICS_PROG, CICS_TRANSID,
       TRIGGER, PARM1, STATION_TEXT)
   VALUES
      ('AMPS', 'SUPUPDATE', '', '',
       '', '', 'Supervisor update');

INSERT
   INTO BBRXA.STATION_TYPE_VW
      (APPL, STATION_TYPE, CICS_PROG, CICS_TRANSID,
       TRIGGER, PARM1, STATION_TEXT)
   VALUES
      ('AMPS', 'TYPESET', '', '',
       '', '', 'Typeset');

INSERT
   INTO BBRXA.STATION_TYPE_VW
      (APPL, STATION_TYPE, CICS_PROG, CICS_TRANSID,
       TRIGGER, PARM1, STATION_TEXT)
```

```
VALUES
    ('AMPS', 'LOGIN', '', '',
    '', '', 'Login');

INSERT
   INTO BBRXA.STATION_TYPE_VW
      (APPL, STATION_TYPE, CICS_PROG, CICS_TRANSID,
      TRIGGER, PARM1, STATION_TEXT)
   VALUES

'', '', 'Routing/Billing');

INSERT
   INTO BBRXA.STATION_TYPE_VW
      (APPL, STATION_TYPE, CICS_PROG, CICS_TRANSID,
      TRIGGER, PARM1, STATION_TEXT)
   VALUES
    ('AMPS', 'TEXT ENTRY', '', '',
    '', '', 'Text Entry');

INSERT
   INTO BBRXA.STATION_TYPE_VW
      (APPL, STATION_TYPE, CICS_PROG, CICS_TRANSID,
      TRIGGER, PARM1, STATION_TEXT)
   VALUES
    ('AMPS', 'KEY VERIFY', '', '',
    '', '', 'Key Verify');

INSERT
   INTO BBRXA.STATION_TYPE_VW
      (APPL, STATION_TYPE, CICS_PROG, CICS_TRANSID,
      TRIGGER, PARM1, STATION_TEXT)
   VALUES
    ('AMPS', 'RAD', '', '',
    '', '', 'Sync station for RAD');

INSERT
   INTO BBRXA.STATION_TYPE_VW
      (APPL, STATION_TYPE, CICS_PROG, CICS_TRANSID,
      TRIGGER, PARM1, STATION_TEXT)
   VALUES
    ('AMPS', 'RAD-GRAF', '', '',
    '', '', 'RAD-GRAF');

INSERT
   INTO BBRXA.STATION_TYPE_VW
      (APPL, STATION_TYPE, CICS_PROG, CICS_TRANSID,
      TRIGGER, PARM1, STATION_TEXT)
   VALUES
    ('AMPS', 'CAMERA', '', '',
    '', '', 'Camera');

INSERT
   INTO BBRXA.STATION_TYPE_VW
```

```
        (APPL, STATION_TYPE, CICS_PROG, CICS_TRANSID,
        TRIGGER, PARM1, STATION_TEXT)
    VALUES
        ('AMPS', 'ART QA', '', '',
        '', '', 'Art Quality Assurance');

INSERT
    INTO BBRXA.STATION_TYPE_VW
        (APPL, STATION_TYPE, CICS_PROG, CICS_TRANSID,
        TRIGGER, PARM1, STATION_TEXT)
    VALUES
        ('AMPS', 'QC', '', '',
        '', '', 'Quality Assurance');

INSERT
    INTO BBRXA.STATION_TYPE_VW
        (APPL, STATION_TYPE, CICS_PROG, CICS_TRANSID,
        TRIGGER, PARM1, STATION_TEXT)
    VALUES
        ('AMPS', 'LOGOUT', '', '',
        '', '', 'Logout');

INSERT
    INTO BBRXA.STATION_TYPE_VW
        (APPL, STATION_TYPE, CICS_PROG, CICS_TRANSID,
        TRIGGER, PARM1, STATION_TEXT)
    VALUES
        ('AMPS', 'VOLT-DN', '', '',
        '', '', 'Volt to DN');

INSERT
    INTO BBRXA.STATION_TYPE_VW
        (APPL, STATION_TYPE, CICS_PROG, CICS_TRANSID,
        TRIGGER, PARM1, STATION_TEXT)
    VALUES
        ('AMPS', 'SENT', '', '',
        '', '', 'Sent');

INSERT
    INTO BBRXA.STATION_TYPE_VW
        (APPL, STATION_TYPE, CICS_PROG, CICS_TRANSID,
        TRIGGER, PARM1, STATION_TEXT)
    VALUES
        ('AMPS', 'RECEIVED', '', '',
        '', '', 'Received');

INSERT
    INTO BBRXA.ROUTE_TYPE_VW
        (APPL, OPCO, ROUTE_TYPE)
    VALUES
        ('AMPS', 'BB', 'TXT CHG');

INSERT
    INTO BBRXA.ROUTE_TYPE_VW
        (APPL, OPCO, ROUTE_TYPE)
```

```
    VALUES
        ('AMPS', 'BB', 'NO TXT CHG');

INSERT
    INTO BBRXA.ROUTE_TYPE_VW
        (APPL, OPCO, ROUTE_TYPE)
    VALUES
        ('AMPS', 'BB', 'ART');

INSERT
    INTO BBRXA.ROUTE_TYPE_VW
        (APPL, OPCO, ROUTE_TYPE)
    VALUES
        ('AMPS', 'BB', 'AD TO PG');

INSERT
    INTO BBRXA.ROUTE_TYPE_VW
        (APPL, OPCO, ROUTE_TYPE)
    VALUES
        ('AMPS', 'BB', '" AD TO PG');

INSERT
    INTO BBRXA.ROUTE_TYPE_VW
        (APPL, OPCO, ROUTE_TYPE)
    VALUES
        ('AMPS', 'BB', 'DN');

INSERT
    INTO BBRXA.ROUTE_TYPE_VW
        (APPL, OPCO, ROUTE_TYPE)
    VALUES
        ('AMPS', 'BB', 'COPY SHEET');

INSERT
    INTO BBRXA.ROUTE_TYPE_VW
        (APPL, OPCO, ROUTE_TYPE)
    VALUES
        ('AMPS', 'TM', 'TXT CHG');

INSERT
    INTO BBRXA.ROUTE_TYPE_VW
        (APPL, OPCO, ROUTE_TYPE)
    VALUES
        ('AMPS', 'TM', 'NO TXT CHG');

INSERT
    INTO BBRXA.ROUTE_TYPE_VW
        (APPL, OPCO, ROUTE_TYPE)
    VALUES
        ('AMPS', 'TM', 'ART');

INSERT
    INTO BBRXA.ROUTE_TYPE_VW
        (APPL, OPCO, ROUTE_TYPE)
```

```
VALUES
    ('AMPS', 'TM', 'AD TO PG');
INSERT
  INTO BBRXA.ROUTE_TYPE_VW
    (APPL, OPCO, ROUTE_TYPE)
  VALUES
    ('AMPS', 'TM', '" AD TO PG');
INSERT
  INTO BBRXA.ROUTE_TYPE_VW
    (APPL, OPCO, ROUTE_TYPE)
  VALUES
    ('AMPS', 'TM', 'DN');
INSERT
  INTO BBRXA.ROUTE_TYPE_VW
    (APPL, OPCO, ROUTE_TYPE)
  VALUES
    ('AMPS', 'TM', 'COPY SHEET');
INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('BB', 'AMPS', 'TXT CHG',
     '*START', 'TEXT ENTRY', '');
INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('BB', 'AMPS', 'TXT CHG',
     'TEXT ENTRY', 'KEY VERIFY', '');
INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('BB', 'AMPS', 'TXT CHG',
     'KEY VERIFY', 'RAD', '');
INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('BB', 'AMPS', 'TXT CHG',
     'RAD', 'RAD-GRAF', '');
INSERT
  INTO BBRXA.ROUTE_VW
    (OPCO, APPL, ROUTE_TYPE,
```

```
            CURR_STATION_TYPE, NEXT_STATION_TYPE, PARM1)
   VALUES
      ('BB', 'AMPS', 'TXT CHG',
       'RAD-GRAF', '*END', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('BB', 'AMPS', 'NO TXT CHG',
       '*START', 'RAD', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('BB', 'AMPS', 'NO TXT CHG',
       'RAD', 'RAD-GRAF', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('BB', 'AMPS', 'NO TXT CHG',
       'RAD-GRAF', '*END', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('BB', 'AMPS', 'ART',
       '*START', 'ART QA', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('BB', 'AMPS', 'ART',
       'ART QA', 'RAD', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('BB', 'AMPS', 'ART',
       'RAD', 'RAD-GRAF', '');

INSERT
   INTO BBRXA.ROUTE_VW
      (OPCO, APPL, ROUTE_TYPE,
```

```
        CURR_STATION_TYPE, NEXT_STATION_TYPE, PARM1)
   VALUES
      ('BB', 'AMPS', 'ART',
       'RAD-GRAF', '*END', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('TM', 'AMPS', 'ART',
       'RAD', 'RAD-GRAF', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('TM', 'AMPS', 'ART',
       'RAD-GRAF', '*END', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('TM', 'AMPS', 'AD TO PG',
       '*START', 'RAD', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('TM', 'AMPS', 'AD TO PG',
       'RAD', 'RAD-GRAF', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('TM', 'AMPS', 'AD TO PG',
       'RAD-GRAF', 'QC', '');

INSERT
   INTO BBRXA.ROUTE_VW
      (OPCO, APPL, ROUTE_TYPE,
       CURR_STATION_TYPE, NEXT_STATION_TYPE, PARM1)
   VALUES
      ('TM', 'AMPS', 'AD TO PG',
       'QC', 'LOGOUT', '');
```

```
INSERT
  INTO BBRXA.ROUTE_VW
    (OPCO, APPL, ROUTE_TYPE,
     CURR_STATION_TYPE, NEXT_STATION
  VALUES
    ('TM', 'AMPS', 'AD TO PG',
     'LOGOUT', '*END', '');

INSERT
  INTO BBRXA.ROUTE_VW
    (OPCO, APPL, ROUTE_TYPE,
     CURR_STATION_TYPE, NEXT_STATION_TYPE, PARM4)
  VALUES
    ('TM', 'AMPS', 'AD TO PG',
     '*START', 'RAD', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'AD TO PG',
     'RAD', 'RAD-GRAF', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'AD TO PG',
     'RAD-GRAF', 'QC', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'AD TO PG',
     'QC', 'CAMERA', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'AD TO PG',
     'CAMERA', 'LOGOUT', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'AD TO PG',
     'LOGOUT', '*END', '');
```

```
INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'DN',
     ...

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'DN',
     'VOLT-DN', 'SENT', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'DN',
     'SENT', 'RECEIVED', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'DN',
     'RECEIVED', '*END', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'COPY SHEET',
     '*START', 'SENT', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'COPY SHEET',
     'SENT', 'RECEIVED', '');

INSERT
  INTO BBRXA.ROUTE_VW
    (OPCO, APPL, ROUTE_TYPE,
     CURR_STATION_TYPE, NEXT_STATION_TYPE, PARM1)
  VALUES
    ('TM', 'AMPS', 'COPY SHEET',
     'RECEIVED', '*END', '');
```

```
GRANT DBADM
  ON DATABASE BBRXA
  TO XXXXX;

GRANT DELETE, INSERT, SELECT, UPDATE
  ON TABLE BBRXA.ROUTE_TYPE_VW,
           BBRXA.ROUTE_VW,
           BBRXA.PIECE_TYPE_VW,
           BBRXA.PIECE_VW,
           BBRXA.STATION_TYPE_VW
  TO PUBLIC;

-------------------------------------------------------------

DROP   SYNONYM  STATION_TYPE_VW    ;
DROP   SYNONYM  ROUTE_TYPE_VW      ;
DROP   SYNONYM  ROUTE_VW           ;
DROP   SYNONYM  PIECE_TYPE_VW      ;
DROP   SYNONYM  PIECE_VW           ;
DROP   SYNONYM  APPL_TYPE_VW       ;
DROP   SYNONYM  OPCO_TYPE_VW       ;
DROP   SYNONYM  IMAGE_SCANNED_VW   ;
DROP   SYNONYM  IMAG_PIECE_VW      ;
DROP   SYNONYM  WW_ASSOC_VW        ;
DROP   SYNONYM  SYNC_ASSOC_VW      ;
DROP   SYNONYM  SYNC_VW            ;

CREATE SYNONYM STATION_TYPE_VW     FOR BBRXA.STATION_TYPE_VW;
CREATE SYNONYM ROUTE_TYPE_VW       FOR BBRXA.ROUTE_TYPE_VW;
CREATE SYNONYM ROUTE_VW            FOR BBRXA.ROUTE_VW;
CREATE SYNONYM PIECE_TYPE_VW       FOR BBRXA.PIECE_TYPE_VW;
CREATE SYNONYM PIECE_VW            FOR BBRXA.PIECE_VW;
CREATE SYNONYM APPL_TYPE_VW        FOR BBRXA.APPL_TYPE_TB;
CREATE SYNONYM OPCO_TYPE_VW        FOR BBRXA.OPCO_TYPE_TB;
CREATE SYNONYM IMAGE_SCANNED_VW    FOR BBRXA.IMAGE_SCANNED_TB;
CREATE SYNONYM IMAG_PIECE_VW       FOR BBRXA.IMAG_PIECE_TB;
CREATE SYNONYM WW_ASSOC_VW         FOR BBRXA.ASSOC_TB;
CREATE SYNONYM SYNC_ASSOC_VW       FOR BBRXA.SYNC_ASSOC_TB;
CREATE SYNONYM SYNC_VW             FOR BBRXA.SYNC_TB;
```

What is claimed is:

1. A method for controlling work on a job in a system for producing a plurality of jobs, each job including at least one piece of work, each piece of work requiring at least one operation to be performed, the system having a plurality of types of stations at which the operations are performed, said method comprising the steps of:

a. accepting into the system a set of job requirements for a job, said set of job requirements including requirements for each of the constituent pieces of work of the job;

b. creating an electronic image of said requirements for each piece of work, said image having a unique image identifier;

c. maintaining a set of control information for each piece of work, said set of control information including said unique image identifier and a unique identifier for the pieces of work;

d. moving each of the pieces of work among the types of stations at which work on the piece must be performed;

e. presenting said image of said requirements for any of the pieces of work to the station to which the piece of work with which said image is associated is presented when the piece of work reaches the station.

2. The method of claim 1 wherein said requirements for each piece of work include a priority for the piece of work and further comprising the steps of:

a. when more than one piece of work is ready for operation at a type of station,
      i. creating a queue of the pieces of work for the type of station;

ii. ordering the pieces of work within said queue based on the priorities of the pieces of work;

iii. sequentially presenting each piece of work in said queue to the first station of the type of station that becomes available to operate on the piece.

3. The method of claim 2 further including the steps of:

a. assembling pieces of work together; and b. maintaining a single set of control information for the assembled pieces of work and allowing the deletion of said control information for each of the pieces of work.

4. The method of claim 2 further comprising the step of changing said priorities for the pieces while the pieces are being processed in the system and reordering the pieces in said queue at each of said stations.

5. The method of claim 2 wherein said control information for each of the pieces of work is contained in a set of data tables and said control information includes a route for each piece of work specifying the types of stations at which operations must be performed on the piece of work and the sequence in which the piece of work is to be moved among the types of stations.

6. The method of claim 5 wherein said route includes branches to more than one station type from a single station type, and further comprising the step of determining the branch that the piece of work follows when the piece of work reaches the station type common to said branches.

7. The method of claim 1 wherein said control information for each of the pieces of work is contained in a set of data tables and said control information includes a route for each piece of work specifying the types of stations at which operations must be performed on the piece of work and the sequence in which the piece of work is to be moved among the types of stations.

8. The method of claim 7 wherein said route includes branches to more than one station type from a single station type, and further comprising the step of determining the branch that the piece of work follows when the piece of work reaches the station type common to said branches.

9. A processor controlling work on a job in a system for producing a plurality of jobs, each job including at least one piece of work, each piece of work requiring at least one operation to be performed, the system having a plurality of types of stations at which the operations are performed, said processor being programmed to carry out the following steps:

a. accepting into the system a set of job requirements for a job, said set of job requirements including requirements for each of the constituent pieces of work of the job;

b. creating an electronic image of said requirements for each piece of work, said image having a unique image identifier;

c. maintaining a set of control information for each piece of work, said set of control information including said unique image identifier and a unique identifier for the piece of work;

d. moving each of the pieces of work among the types of stations at which work on the piece must be performed;

e. presenting said image of said requirements for one of the pieces of work to the station to which the piece of work with which said image is associated is presented when the piece of work reaches the station.

10. A method for controlling work on the trade advertisement in a system for producing a plurality of trade advertisement, each trade advertisement including at least one piece of text work and one piece of art work, each of said piece of text work and said piece of art work requiring at least one operation to be performed, the system having a plurality of types of stations at which the operations are performed, said method comprising the steps of:

a. accepting into the system a copysheet including a set of job requirements for a trade advertisement, said set of job requirements including requirements for each of said piece of text work and said piece of art work;

b. creating an electronic image of said copysheet and assigning a unique image identifier to said image;

c. maintaining a set of control information for each of said piece of text work and said piece of art work, said set of control information including said unique image identifier and a unique identifier for each of said piece of text work and said piece of art work;

d. moving each of said piece of text work and said piece of art work among the types of stations at which work on said pieces must be performed;

e. presenting said image of said copysheet to the station to which said piece of text work or said piece of art work is presented when said piece reaches the station.

11. A method for controlling work on a job in a system for producing a plurality of jobs, each job including at least ne piece of work, each piece of work requiring at least one operation to be performed, the system having a plurality of types of stations at which the operations are performed, said method comprising the steps of:

a. accepting into the system a set of job requirements for a job, aid set of job requirements including requirements for each of the constituent pieces of work of the job, said requirements for each piece of work include a priority for the piece of work;

b. maintaining a set of control information for each piece of work, said set of control information including a unique identifier for the pieces of work;

c. moving each of the pieces of work among the types of stations at which work on the piece must be performed;

d. when more than one piece of work is ready for operation at a type of station, i. creating a queue of the pieces of work for the type of station;

ii. ordering the pieces of work within said queue based on the priorities of the pieces of work;

iii. sequentially presenting each piece of work in said queue to the first station of the type of station that becomes available to operate on the piece.

* * * * *

UNITED STATES PATENT AND TRADEMARK OFFICE
CERTIFICATE OF CORRECTION

PATENT NO. : 5,243,531

DATED : September 7, 1993

INVENTOR(S) : Gerard L. DiPippo et al.

It is certified that error appears in the above-identified patent and that said Letters Patent is hereby corrected as shown below:

| Column | Line | |
|---|---|---|
| 2 | 5 | Change "ca" to --can--; |
| 6 | 66 | Change "o" to --or--; |
| 7 | 42 | to column 8, line 44, delete text and insert the following: |

--Variable Name | Description
---|---
APPL | A unique identifier for an application that makes calls to the RIS routines.
PIECE | A unique identifier for a piece that is supplied to RIS when the application requests RIS to create the piece.

UNITED STATES PATENT AND TRADEMARK OFFICE
CERTIFICATE OF CORRECTION

PATENT NO. : 5,243,531

DATED : September 7, 1993

INVENTOR(S) : Gerard L. DiPippo et al.

It is certified that error appears in the above-identified patent and that said Letters Patent is hereby corrected as shown below:

| | |
|---|---|
| PIECE_TYPE | The type or category of a piece, taking one of a finite number of values supplied by the application and validated against a list of valid piece types for a given application. |
| OPCO | A unique company identifier used to control some aspects of the system's operation, such as whether a particular operator is permitted to work on pieces of jobs for a particular company. |
| ROUTE_TYPE | A unique identifier for a route through a subset of the stations of an application's system. |
| STATION_TYPE | An identifier for a type of station for a given application. |
| PRIORITY | A simple sort key used to sort pieces queued for operation by a particular station type. Priority is assigned to a piece when it is created, and may be changed during the system's operation. |

UNITED STATES PATENT AND TRADEMARK OFFICE
CERTIFICATE OF CORRECTION

PATENT NO. : 5,243,531

DATED : September 7, 1993

INVENTOR(S) : Gerard L. DiPippo et al.

It is certified that error appears in the above-identified patent and that said Letters Patent is hereby corrected as shown below:

| | |
|---|---|
| LOCK | A binary flag indicating whether a particular piece is blocked from acquisition by a station. |
| ACQUIRED | A binary flag indicating whether a particular piece has been acquired by a station. |
| RELEASED | A binary flag indicating whether a particular piece has been released by a station. |
| OPERATOR | A unique identifier for the person operating a station. |
| TO_STATION | Used by the RELEASE_PIECE routine, it is the station type to which a piece goes when it is released. It can be the next station in the piece's route, the same station (indicating that the piece is not yet to be sent to another station) or a specified route station other than the next station. |

UNITED STATES PATENT AND TRADEMARK OFFICE
CERTIFICATE OF CORRECTION

PATENT NO. : 5,243,531

DATED : September 7, 1993

INVENTOR(S) : Gerard L. DiPippo et al.

Page 4 of 7

It is certified that error appears in the above-identified patent and that said Letters Patent is hereby corrected as shown below:

| | |
|---|---|
| TO_ROUTE | Also used by RELEASE_PIECE, it is the destination route to which a piece goes when it is released. |
| CURR_STATION_TYPE | Used to define a step in a route, it is linked with NEXT_STATION_TYPE to indicate the sequence in which a piece should move among the station types. |
| NEXT_STATION_TYPE | Used with CURR_STATION_TYPE to define a step in a route. |
| DEFAULT | A flag used to indicate which of several possible NEXT_STATION_TYPE a piece should move to absent specific instruction to the contrary. |

UNITED STATES PATENT AND TRADEMARK OFFICE
CERTIFICATE OF CORRECTION

PATENT NO. : 5,243,531
DATED : September 7, 1993
INVENTOR(S) : Gerard L. DiPippo et al.

It is certified that error appears in the above-identified patent and that said Letters Patent is hereby corrected as shown below:

| | |
|---|---|
| TRIGGER | A binary flag used for an operatorless, non-terminal station. If a piece enters the station it will trigger the station's operation. |
| STATION_TEXT | A holder for control parameters for the operation of a station. |
| DOC_ID | A unique identifier for a control document image. |
| TRANS | A transaction that an operatorless station executes when a piece is [released to it?] |
| ASSOC | A unique identifier for an association of pieces. |
| FUNCTION | A holder for an option parameter passed into a RIS routine.-- |

UNITED STATES PATENT AND TRADEMARK OFFICE
CERTIFICATE OF CORRECTION

PATENT NO. : 5,243,531

DATED : September 7, 1993

INVENTOR(S) : Gerard L. DiPippo et al.

It is certified that error appears in the above-identified patent and that said Letters Patent is hereby corrected as shown below:

| Column | Line | |
|---|---|---|
| 10 | 4 | change "STATION_TYPE" to --STATION_TEXT--; |
| 12 | 60 | before line 61, insert a blank line; |
| 15 | 21 | change "ot" to --to--; |
| 18 | 35 | insert the following: |

--deletes from WORKWITH_ASSOC_TB the row containing the specified APPL and ASSOC.

TABLE 24

---

ROUTINE DEL_ASSOC_PIECE

---

/*INPUT INCLUDES: APPL,ASSOC*/
Delete from WORKWITH_ASSOC_TB row with APPL,ASSOC

---

SYNC-This routine gathers pieces that are associated and passes them in one group to another station. It is an asynchronous, non-terminal task performed at an operatorless station, working with the variables PIECE and APPL. As shown schematically in FIGS. 14a and 14b and in pseudo code in Table 25, the routine first selects in step 1404 all distinct synchronization association identifiers ASSOC from the table SYNC_ASSOC_TB that contain the specified piece PIECE and APPL.

UNITED STATES PATENT AND TRADEMARK OFFICE
CERTIFICATE OF CORRECTION

PATENT NO. : 5,243,531
DATED : September 7, 1993
INVENTOR(S) : Gerard L. DiPippo et al.

It is certified that error appears in the above-identified patent and that said Letters Patent is hereby corrected as shown below:

| Column | Line | |
|---|---|---|
| 18 | 39 | change "form" to --from--; |
| 18 | 55 | delete "deletes from WORKWITH_AS-"; |
| 18 | 56-68 | delete entirely; |
| 19 | 1-5 | delete entirely; |
| 20 | 45 | change "inset" to --insert--; |
| 70 | 37 | change "ne" to --one--; |

Signed and Sealed this

Third Day of December, 1996

Attest:

BRUCE LEHMAN

Attesting Officer    Commissioner of Patents and Trademarks